(12) United States Patent
Wang

(10) Patent No.: US 6,173,073 B1
(45) Date of Patent: Jan. 9, 2001

(54) SYSTEM FOR ANALYZING TABLE IMAGES

(75) Inventor: Shin-Ywan Wang, Tustin, CA (US)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/002,684

(22) Filed: Jan. 5, 1998

(51) Int. Cl.$^7$ .................................................... G06K 9/34
(52) U.S. Cl. ........................ 382/176; 382/175; 382/180; 382/171
(58) Field of Search .................................. 382/175, 176, 382/180, 171; 358/453, 462; 395/148

(56) References Cited

U.S. PATENT DOCUMENTS

| | | | |
|---|---|---|---|
| 5,048,107 | 9/1991 | Tachikawa | 382/48 |
| 5,075,895 | * 12/1991 | Bessho | 382/61 |
| 5,101,448 | 3/1992 | Kawachiya et al. | 382/61 |
| 5,129,012 | 7/1992 | Abe | 382/16 |
| 5,185,813 | 2/1993 | Tsujimoto | 382/9 |
| 5,278,920 | 1/1994 | Bernzott et al. | 382/9 |
| 5,335,290 | 8/1994 | Cullen et al. | 382/9 |
| 5,420,695 | 5/1995 | Ohta | 358/462 |
| 5,448,692 | * 9/1995 | Ohta | 395/147 |
| 5,465,304 | 11/1995 | Cullen et al. | 382/176 |
| 5,485,566 | 1/1996 | Rahgozar | 395/148 |
| 5,588,072 | 12/1996 | Wang | 382/176 |
| 5,661,818 | 8/1997 | Gaborski et al. | 382/132 |
| 5,680,478 | 10/1997 | Wang et al. | 382/176 |
| 5,680,479 | 10/1997 | Wang et al. | 382/176 |
| 5,689,342 | 11/1997 | Nakatsuka | 358/296 |

OTHER PUBLICATIONS

Wang, Shin–Ywan, et al., "Block Selection: A Method for Segmenting Page Image of Various Editing Styles", Proceedings of the Third International Conference on Document Analysis and Recognition, Aug. 14–16, 1995, (8 pages).

* cited by examiner

Primary Examiner—Bhavesh Mehta
(74) Attorney, Agent, or Firm—Fitzpatrick, Cella, Harper & Scinto

(57) ABSTRACT

A method for block selection on a image of a table, the table including rows and columns defined by visible and non-visible grid lines and containing table cells, includes identifying super-cells that include one or more table cells, wherein super-cells are identified according to traced white areas surrounding table cells and bounded by visible grid lines, determining whether vertical and horizontal grid lines bounding each table cell are visible or non-visible, and determining whether vertical and horizontal grid lines bounding each super-cell are visible or non-visible.

33 Claims, 31 Drawing Sheets

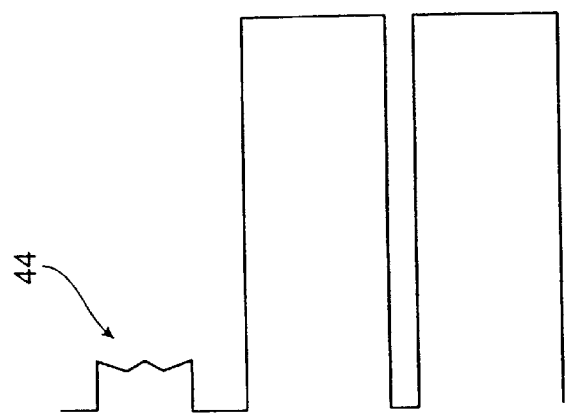
FIG. 6b
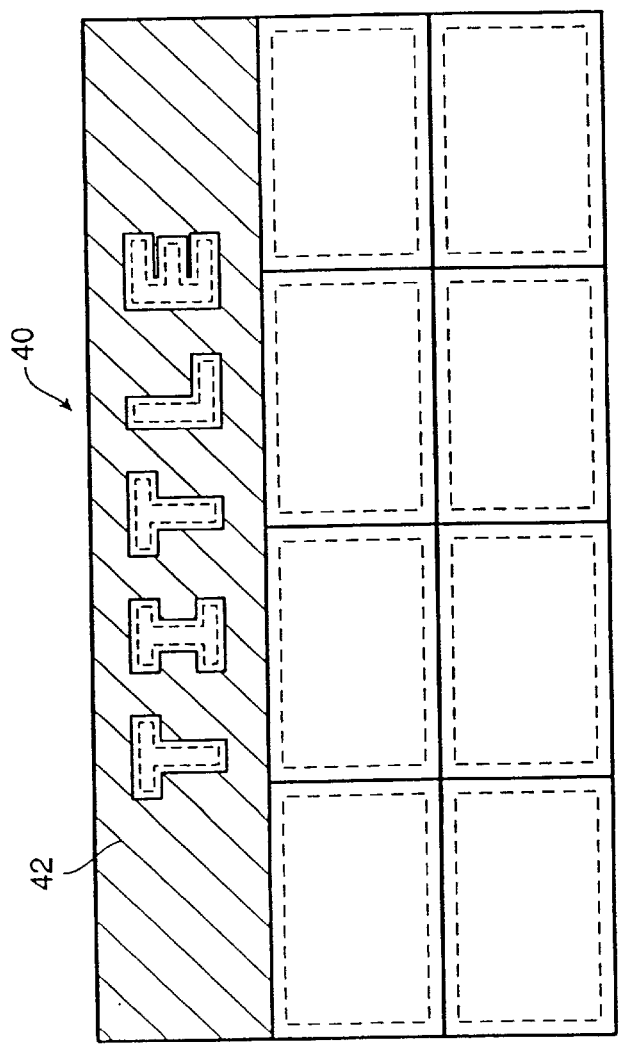
FIG. 6a
FIG. 6

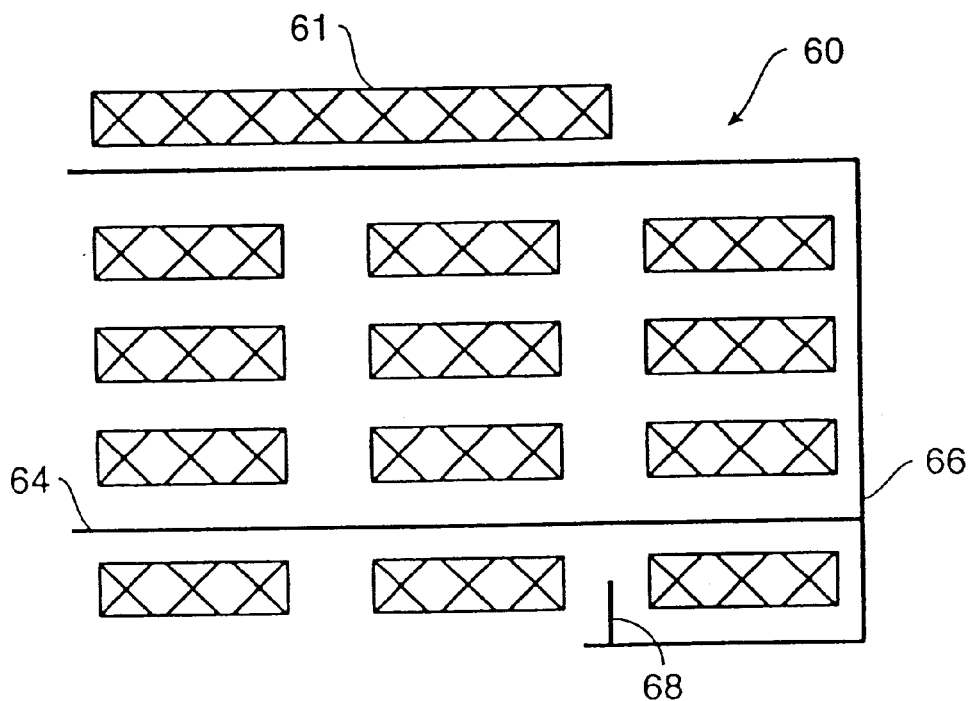
FIG. 10a
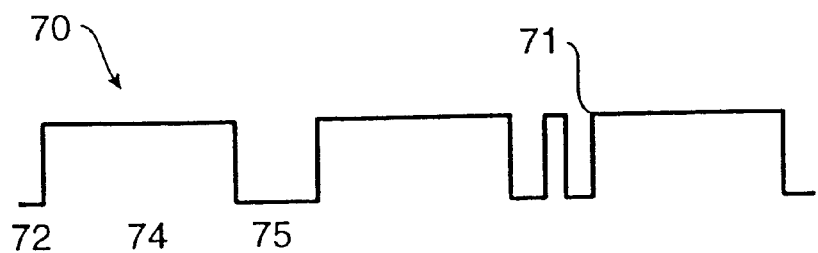
FIG. 10b
FIG. 10

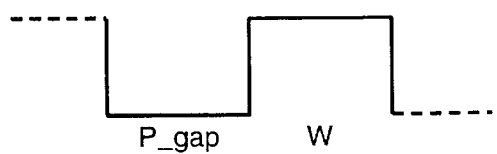
FIG. 11a
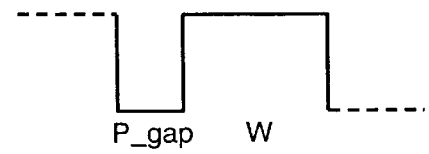
FIG. 11b
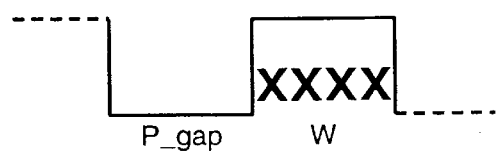
FIG. 11c
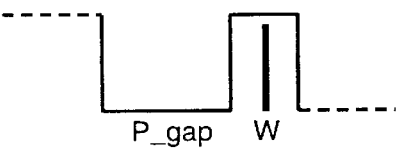
FIG. 11d
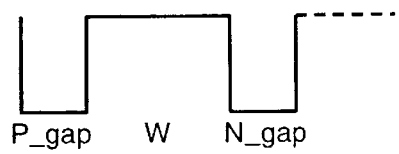
FIG. 11e
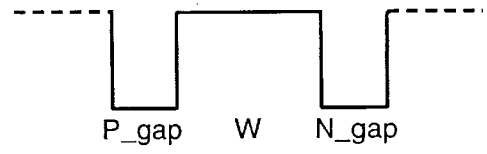
FIG. 11f
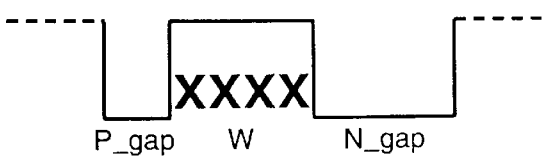
FIG. 11g
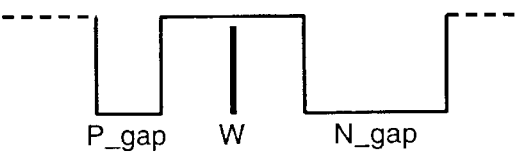
FIG. 11h
FIG. 11

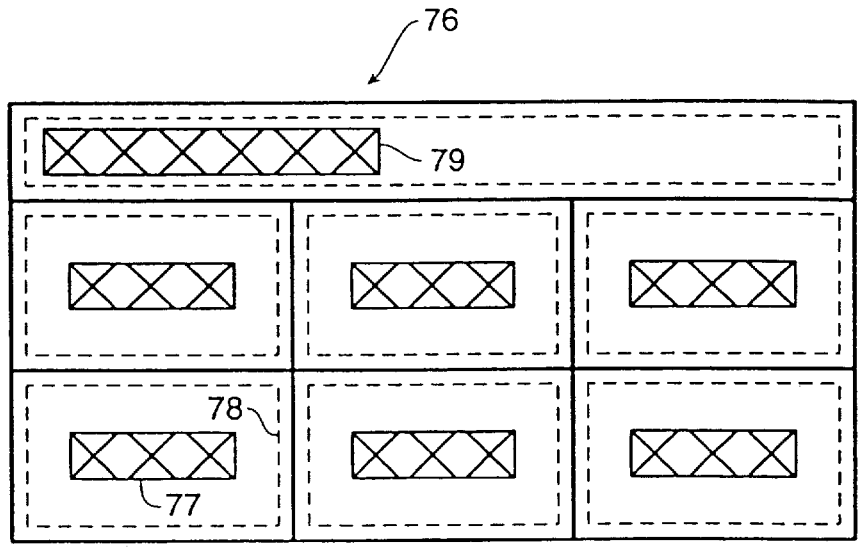
FIG. 12a
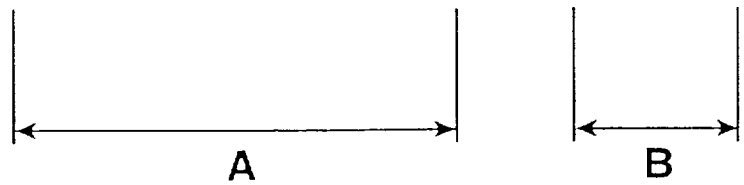
FIG. 12b
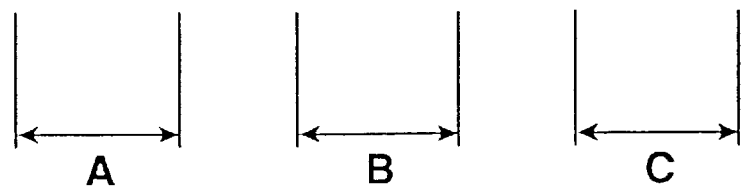
FIG. 12c
FIG. 12

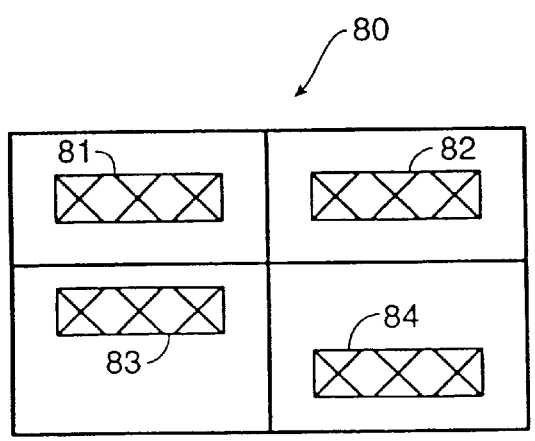 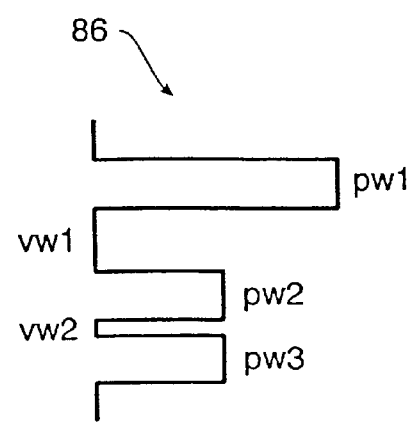
FIG. 14a  FIG. 14b
FIG. 14

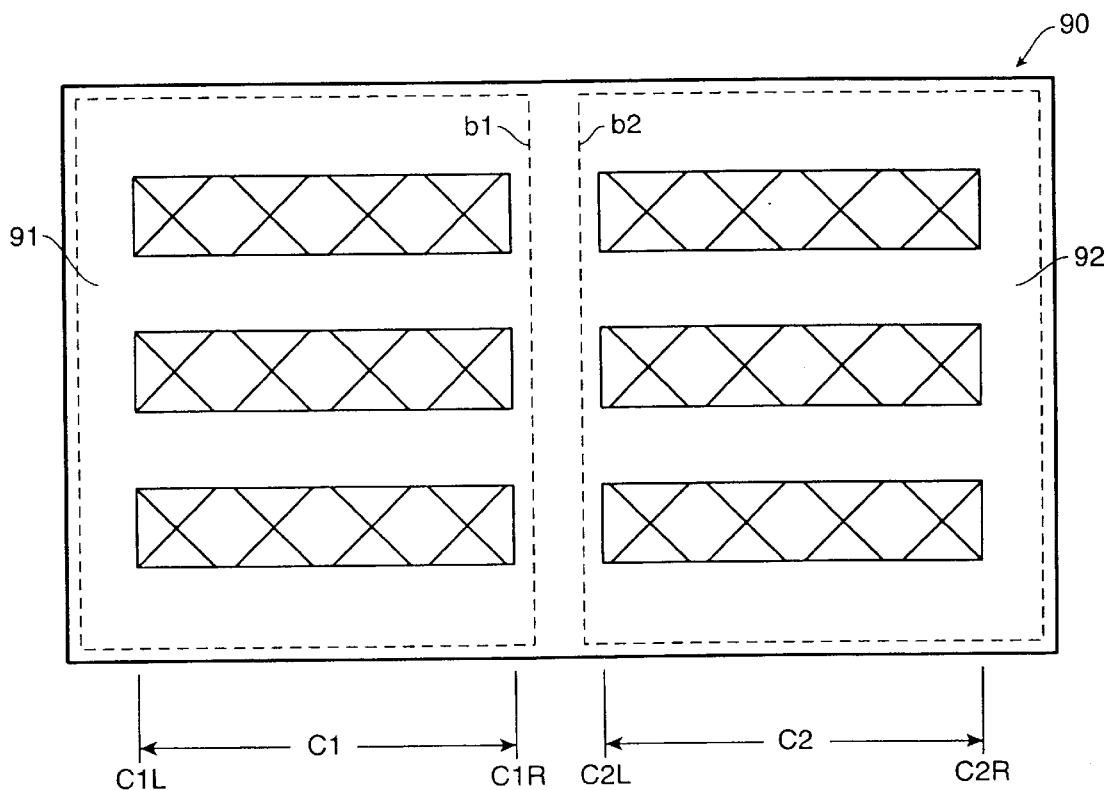
FIG. 16a
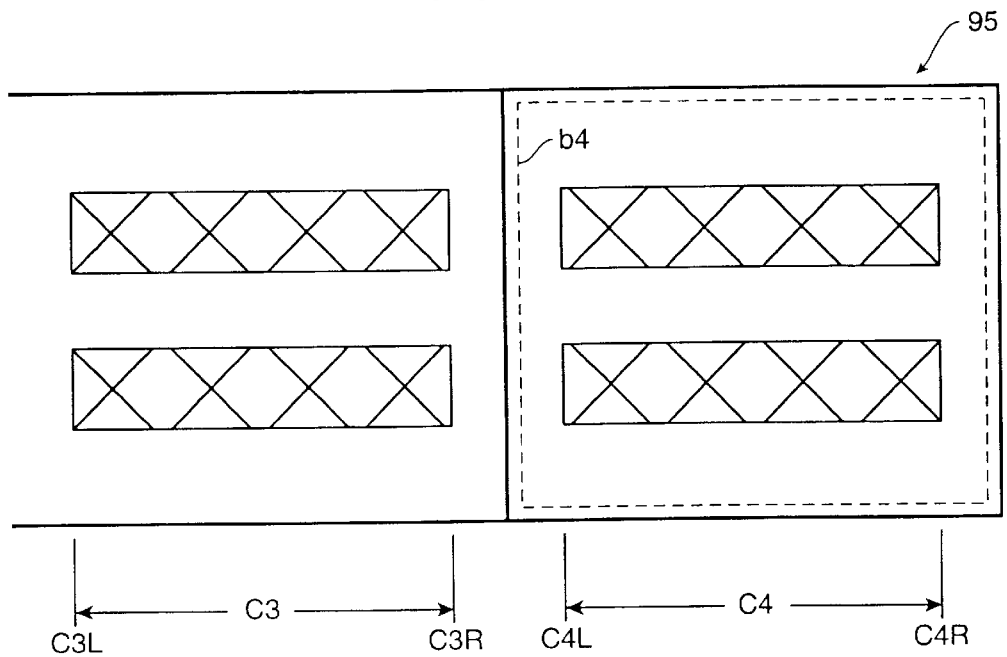
FIG. 16b
FIG. 16

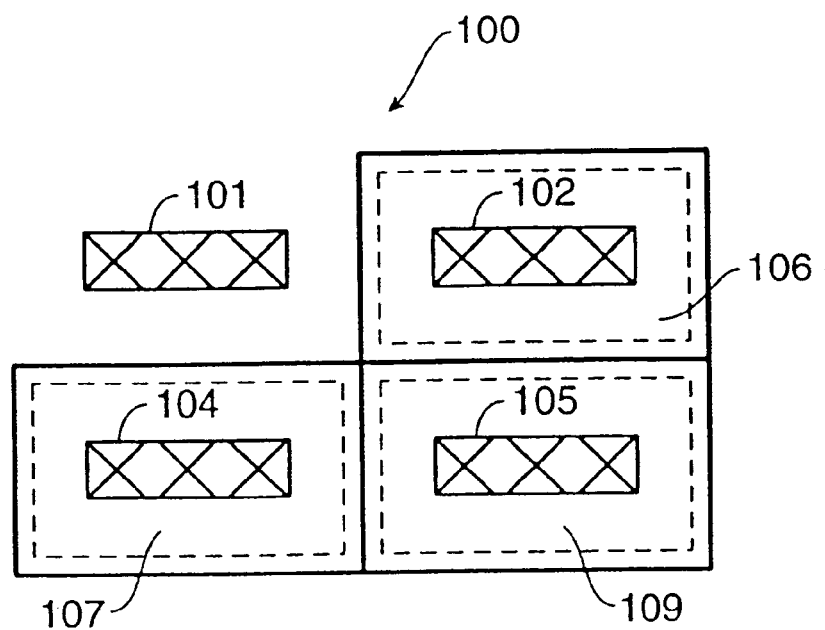
FIG. 18a
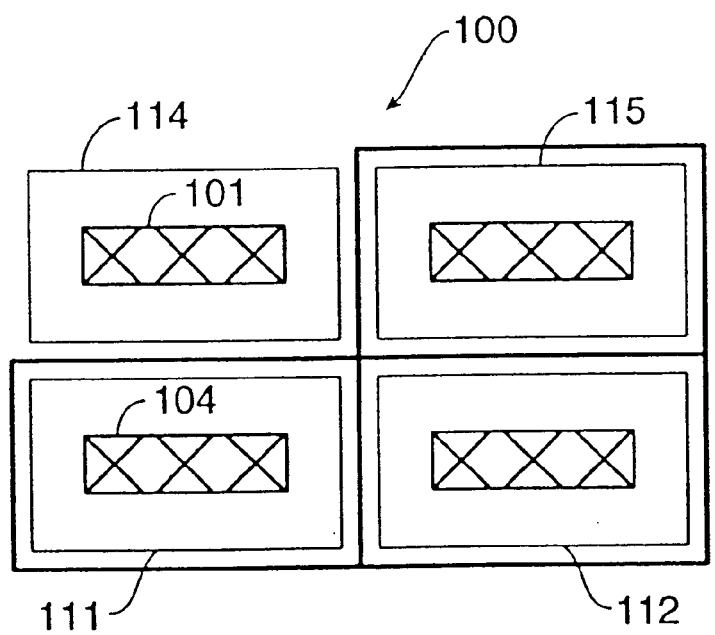
FIG. 18b
FIG. 18

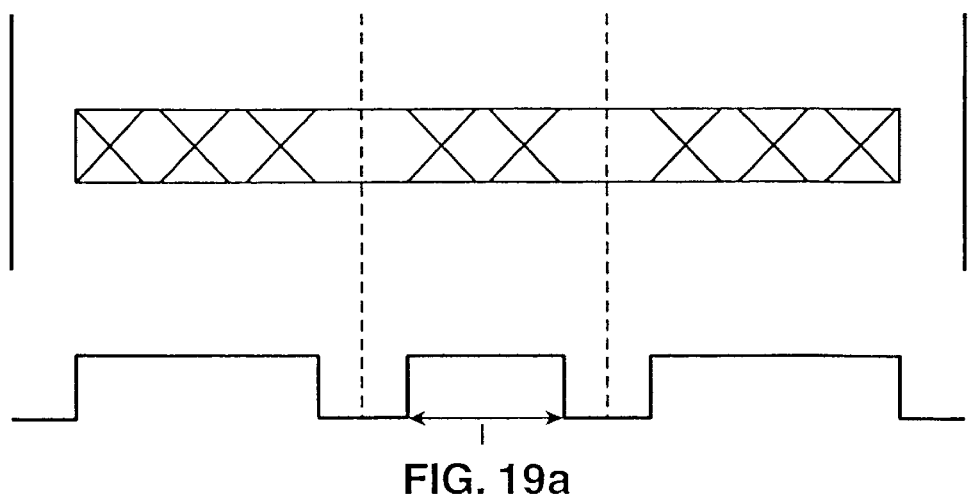
FIG. 19a
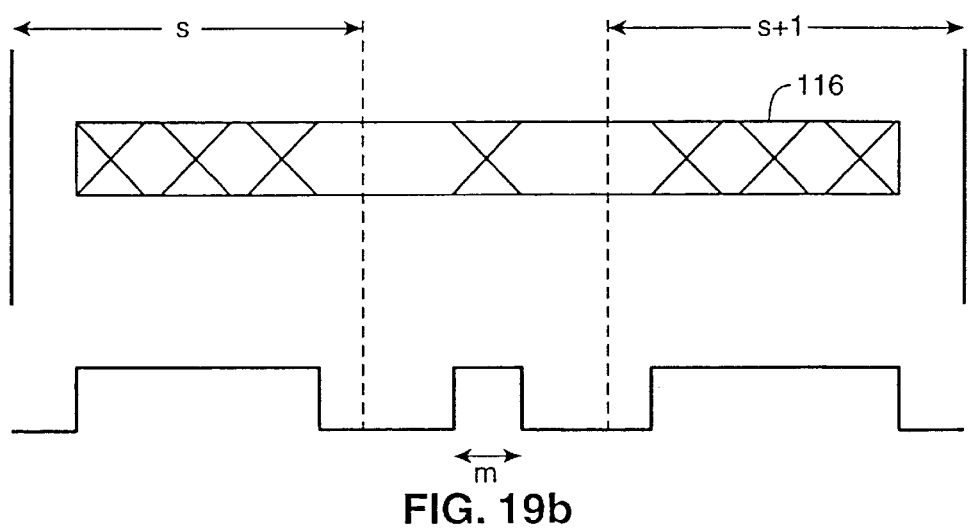
FIG. 19b
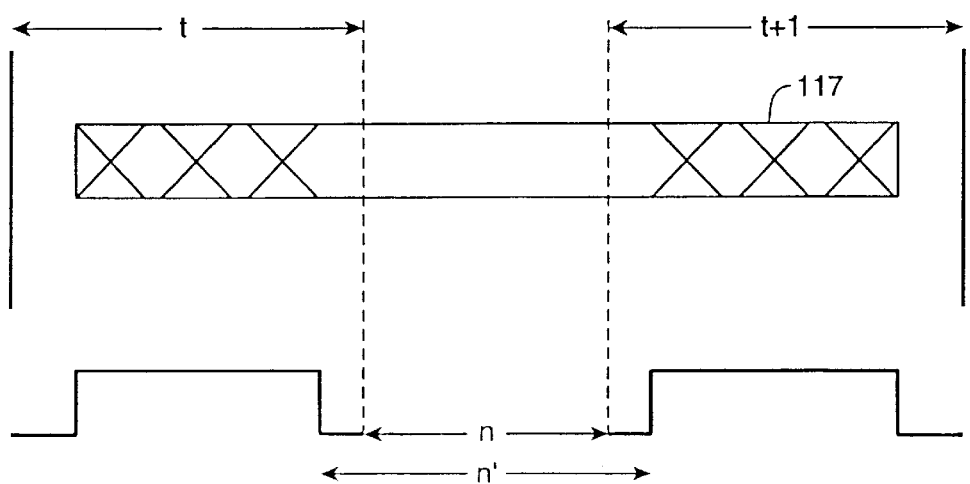
FIG. 19c
FIG. 19

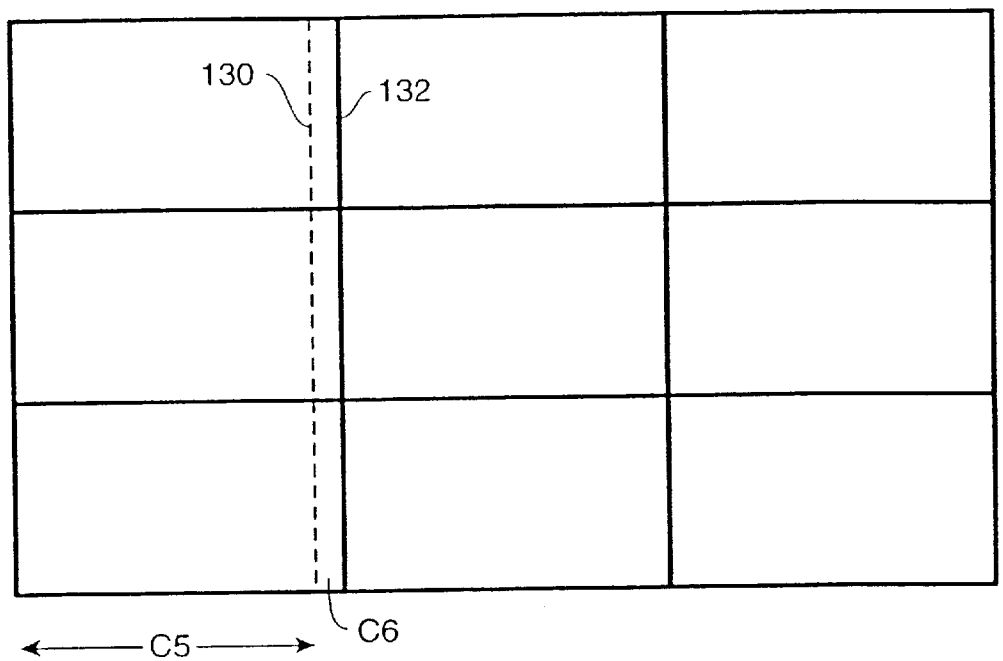
FIG. 22a
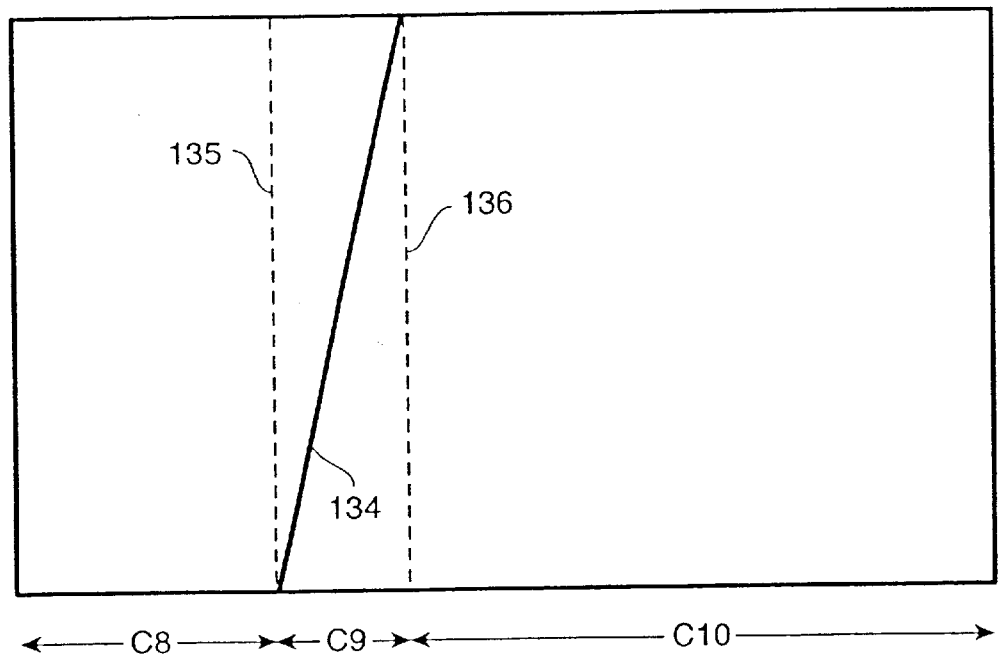
FIG. 22b
FIG. 22

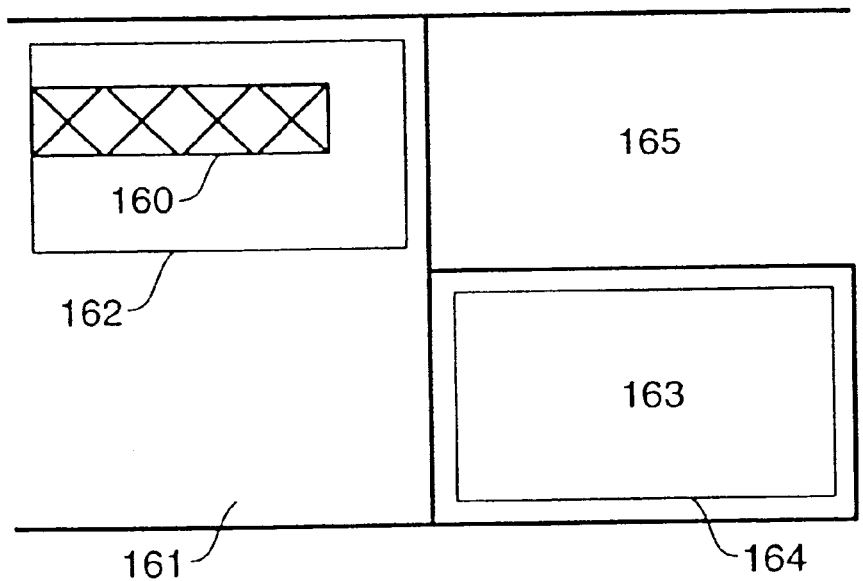
FIG. 26a
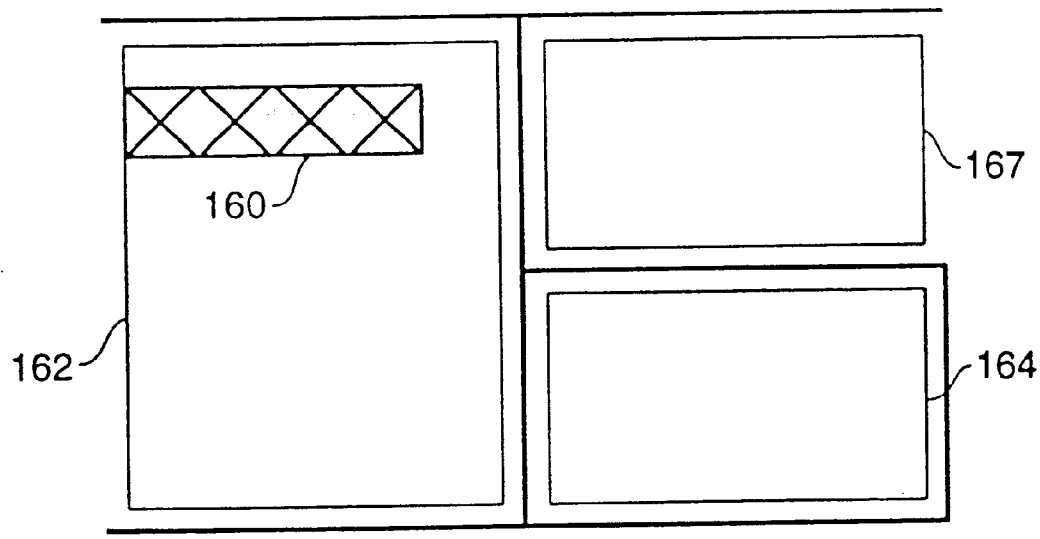
FIG. 26b
FIG. 26

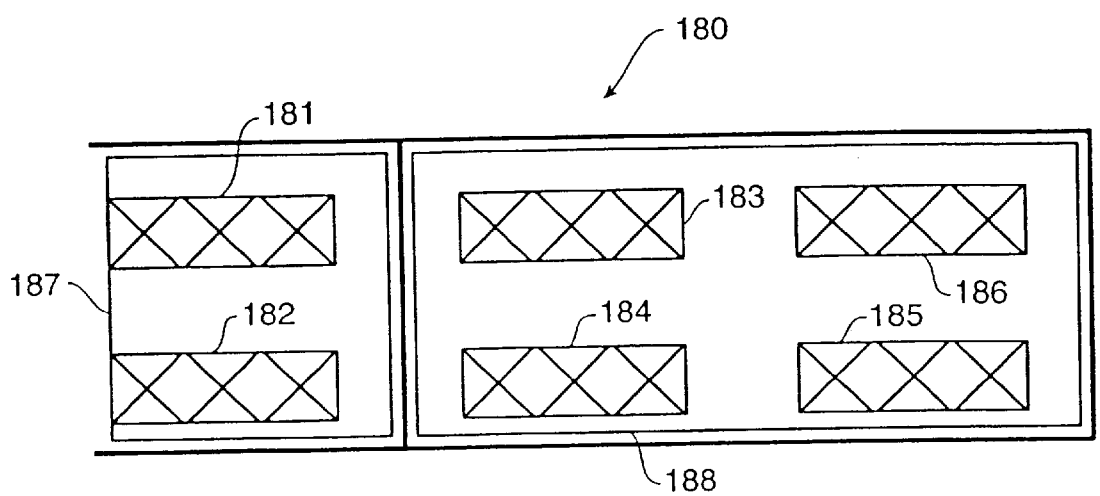
FIG. 28a
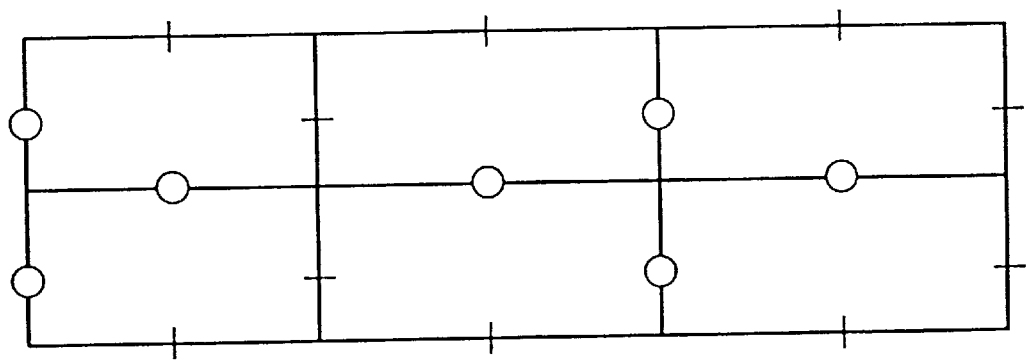
FIG. 28b
FIG. 28

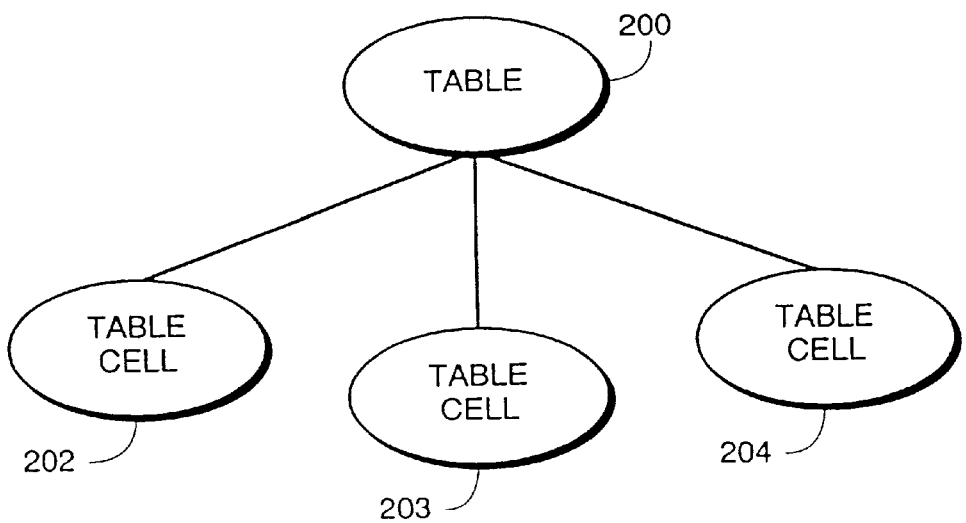
FIG. 29A
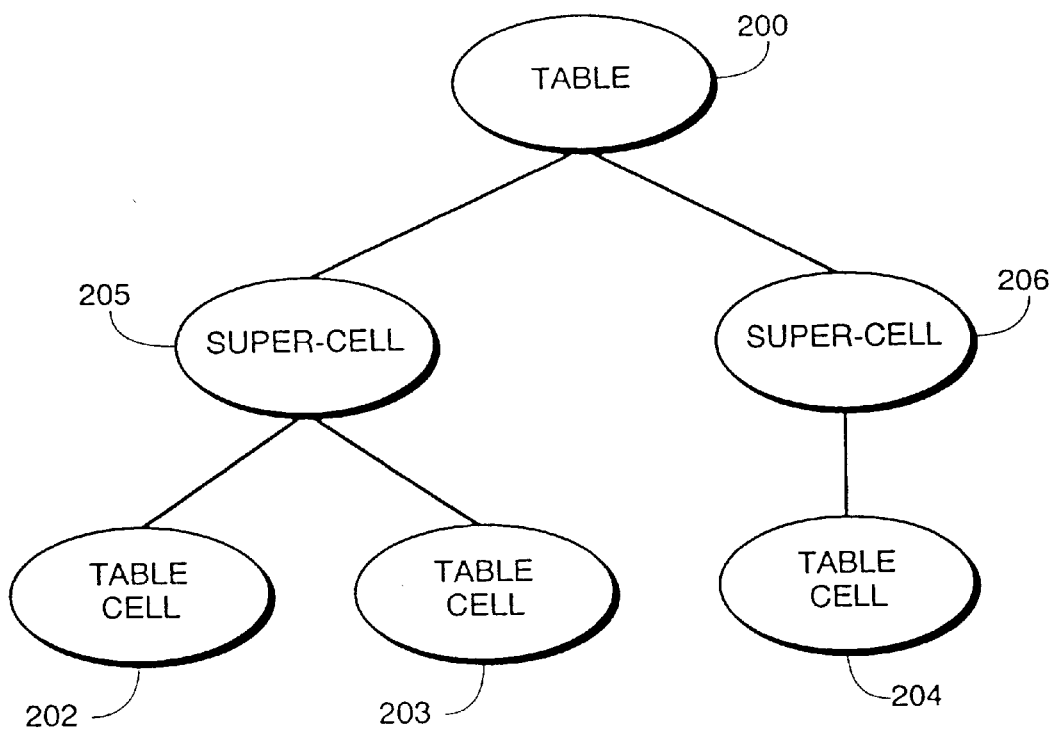
FIG.29B
FIG. 29

SYSTEM FOR ANALYZING TABLE IMAGES

BACKGROUND OF THE INVENTION

1. Field of the Invention

The present invention relates to page segmentation systems for classifying regions of a document image. More particularly, the present invention relates to a block selection system for identifying and defining features within table images.

2. Incorporation by Reference

Commonly-assigned U.S. application Ser. No. 07/873,012, now U.S. Pat. No. 5,680,479, entitled "Method and Apparatus For Character Recognition", Ser. No. 08/171,720, now U.S. Pat. No. 5,583,072, entitled "Method and Apparatus For Selecting Text And/Or Non-Text Blocks In A Stored Document", Ser. No. 08/338,781, entitled "Page Analysis System" now U.S. Pat. No. 5,987,171, Ser. No. 08/514,252, entitled "Feature Extraction System", now U.S. Pat. No. 5,848,186, and Ser. No. 08/664,675, entitled "System For Extracting Attached Text", are herein incorporated as if set forth in full.

3. Description of the Related Art

Conventional page segmentation systems are applied to document images in order to identify data types contained within specific regions of the document images. This information can be used to extract data within a specific region and to determine a type of processing to be applied to the extracted data.

For a document containing a table image, a region of text, or table cell, located within the table image can be converted to ASCII characters using optical character recognition (OCR) processing and stored in an ASCII file along with information corresponding to the location of the table cell. However, conventional systems cannot accurately determine a row and column address corresponding to the table cell. Accordingly, the recognized ASCII characters cannot be reliably input to a spreadsheet based on row and column address data.

In addition, the data produced by conventional systems is often insufficient to adequately recreate the internal features of a bit-mapped table image. For example, the data does not reflect vertical and horizontal grid lines within an analyzed table image. As defined herein, vertical and horizontal grid lines define each row and column within a table, and can be either visible or non-visible. Therefore, although a conventional system can be used to create an ASCII version of a bitmapped table, the ASCII version does not include data representative of table grid lines. Accordingly, the stored data cannot be used to accurately recreate a bit-mapped version of grid lines within the table. Moreover, in a case that it is desired to edit text within a table cell, it is difficult to determine, based on information provided by conventional systems whether the edited text will intersect with a grid line and thereby violate row/column boundaries.

Consequently, what is needed is a system for accurately identifying and representing internal features of a bit-mapped table image, such as rows, columns, and table grid lines.

SUMMARY OF THE INVENTION

The present invention addresses the foregoing by identifying super-cells within a bit-mapped table image. Super-cells are areas of a table image bounded by visible table grid lines and which include one or more table cells. Advantageously, the locations and dimensions of the identified super-cells can be used to reconstruct a bit-mapped image of the visible grid lines of the table image. In addition, by referring to the dimensions of a super-cell surrounding a table cell, it is possible to determine whether editing text of the table cell will cause the edited text to intersect a grid line.

According to one aspect, the invention is a system for performing block selection on a bit-mapped image of a table comprised of table cells arranged into rows and columns, the rows and columns defined by visible and non-visible grid lines. The system identifies super-cells that include one or more table cells, wherein super-cells are identified according to traced white areas surrounding table calls and bounded by visible grid lines, determines whether vertical and horizontal grid lines bounding each table cell are visible or non-visible, and determines whether vertical and horizontal grid lines bounding each super-cell are visible or non-visible.

By virtue of the foregoing, the present invention determines information which can be used to substantially reconstruct the internal features of a table image. Moreover, the determined information can be stored in or along with an ASCII file in order to provide an accurate representation of the entire table image.

In another aspect, rows within a table image are identified by 1) detecting areas of reversed text within the image of the table, 2) calculating a horizontal histogram of connected components within the image of the table, the histogram not reflecting connected components within the detected areas, 3) defining rows within the image of the table according to the horizontal histogram, and 4) re-defining the rows based on locations of traced white areas and partial grid lines with respect to the defined rows.

As a result of the foregoing aspect, table cells can be accurately identified and input to appropriate rows of a spreadsheet.

In a related aspect, columns within the table image are identified by 1) detecting areas of reversed text within the image of the table, 2) calculating a vertical histogram of connected components within the image of the table, the histogram not reflecting connected components within the detected areas, 3) defining columns within the image of the table according to the vertical histogram, and 4) re-defining the columns based on locations of traced white areas and partial grid lines with respect to the defined rows.

By virtue of the foregoing aspects, data contained in table cells can be accurately extracted and output to a spreadsheet application. Moreover, additional cells can be easily added to the table based on existing rows and columns.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 6 is a view of a table having a reversed area.

FIG. 9, comprising

FIG. 10, comprising FIGS. 11a and 10b, illustrates a vertical histogram used in table column calculation of the present-invention.

FIG. 11, comprising FIGS. 11a through 11h, shows various histogram configurations considered during table column calculation according to the present invention.

FIG. 12, comprising FIGS. 12a to 12c, illustrates table column calculation according to the present invention.

FIG. 14 illustrates table row calculation according to the present invention.

FIG. 16, comprising FIGS. 16a and 16b, illustrates vertical grid line calculation according to the present invention.

FIG. 18, comprising FIGS. 18a and 18b, illustrates super-cell creation according to the present invention. I FIG. 19, comprising FIG. 19a to 19c, illustrates vertical histogram configurations considered during column splitting according to the present invention.

FIG. 22, comprising FIGS. 22a and 22b, illustrates column adjustment according to the present invention.

FIG. 26, comprising FIGS. 26a and 26b, illustrates super-cell hole compensation according to the present invention.

FIG. 28, comprising FIGS. 28a and 28b, illustrates relationships between table cells, super-cells, and visible grid lines.

FIG. 29, comprising FIGS. 29a and 29b, shows hierarchical tree structures for storing data representative of table images.

DETAILED DESCRIPTION OF THE PREFERRED EMBODIMENTS

Figure 1:
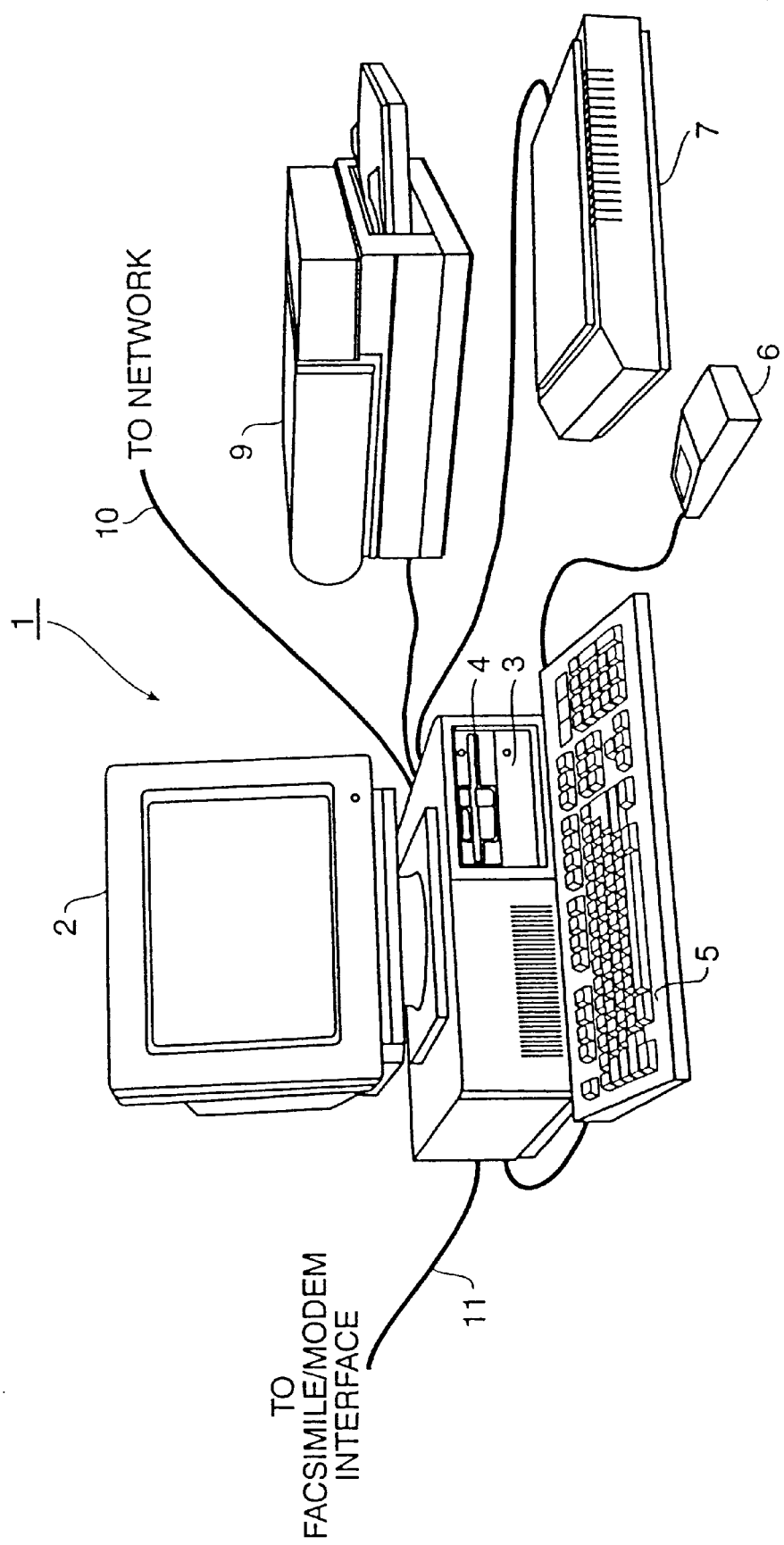
FIG. 1 is a view showing representative computing equipment embodying the present invention.

FIG. 1 is a view showing the outward appearance of representative computing equipment embodying a block selection-based table analysis system according to the present invention.

Shown in FIG. 1 is computing equipment 1, such as an IBM PC or PC-compatible computer having a windowing operating system such as the Microsoft Windows95 operating system. Computing equipment 1 is provided with either a monochromatic or color display monitor 2, using which computing equipment 1 displays images to a user. Computing equipment 1 is also provided with fixed disk drive 3 for storing data files and application program files, keyboard 5 for inputting text data and for manipulating objects displayed on display screen 2, and pointing device 6, such as a mouse, which is provided for pointing to and manipulating objects displayed on display screen 2.

Computing system 1 also includes floppy disk drive 4 for reading from and writing to a floppy disk. Document image files including table images, as well as computer-executable process steps embodying the present invention, may be stored either on fixed disk 3 or on a floppy disk inserted in floppy disk drive 4. Alternatively, document image files and/or computer-executable process steps may be obtained from a CD-ROM accessed via a CD-ROM drive (not shown).

Also provided with computing equipment 1 are network interface 10 for interfacing with a local area network, and facsimile/modem interface 11 for sending and receiving facsimile messages and other data files. Document image files and computer-executable process steps embodying the present invention may be accessed over a network via network interface 10. In addition, facsimile/modem interface 11 can also be used for retrieving images and/or computer-executable process steps from the World Wide Web (hereafter WWW).

Most typically, the applications stored on fixed disk 3, including a block selection application according to the present invention, are stored to disk 3 after being downloaded from a computer-readable medium, such as a floppy disk, a CD-ROM, a network drive, or the WWW.

A document image may be input by scanner 7, which scans a document in order to provide bit-mapped image data of the document to computing equipment 1. The bit-mapped image data, which includes bit-mapped table image data, may be stored onto fixed disk 3 in either a compressed or an uncompressed format.

Printer 9 is provided for outputting document images processed by computing equipment 1.

In operation, and under control of the( windowing operating system, stored application programs, such as a block selection application according to the present invention, are selectably activated to process and to manipulate stored data. In accordance with operator instructions, and based on the stored application programs, commands are issued to display images on screen 2, and to print the displayed images using printer 9.

Figure 2:
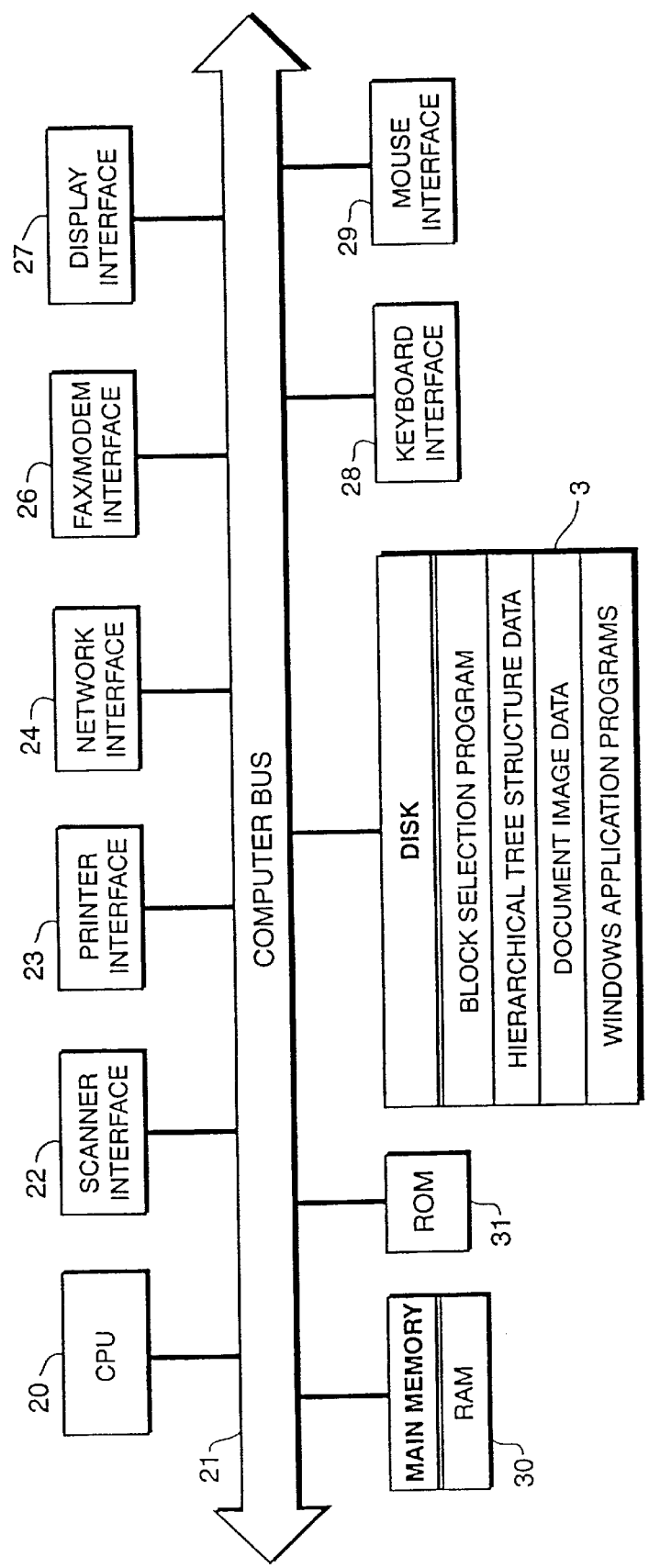
FIG. 2 is a block diagram illustrating the internal architecture of a computer utilizing the present invention.

FIG. 2 is a detailed block diagram showing the internal construction of computing equipment 1. As shown in FIG. 2, computing equipment 1 includes a central processing unit (CPU) 20, such as a programmed microprocessor, interfaced to computer bus 21. Also interfaced to computer bus 21 are scanner interface 22, printer interface 23, network interface 24, fax/modem interface 26, display interface 27, keyboard interface 28, and mouse interface 29.

Main memory 30, such as random access memory (RAM), interfaces to computer bus 21 so as to provide CPU 20 with access to memory storage. In particular, when executing computer-executable process steps such as those stored on disk 3, CPU 20 loads those steps from disk 3 or other storage media into main memory 30 and executes those process steps out of main memory 30.

Read-only memory (ROM) 31 is used for storing computer-executable process steps, such as those used during boot-up, or basic input/output operating system (BIOS) sequences for operation of, for example, keyboard 5.

Figure 3:
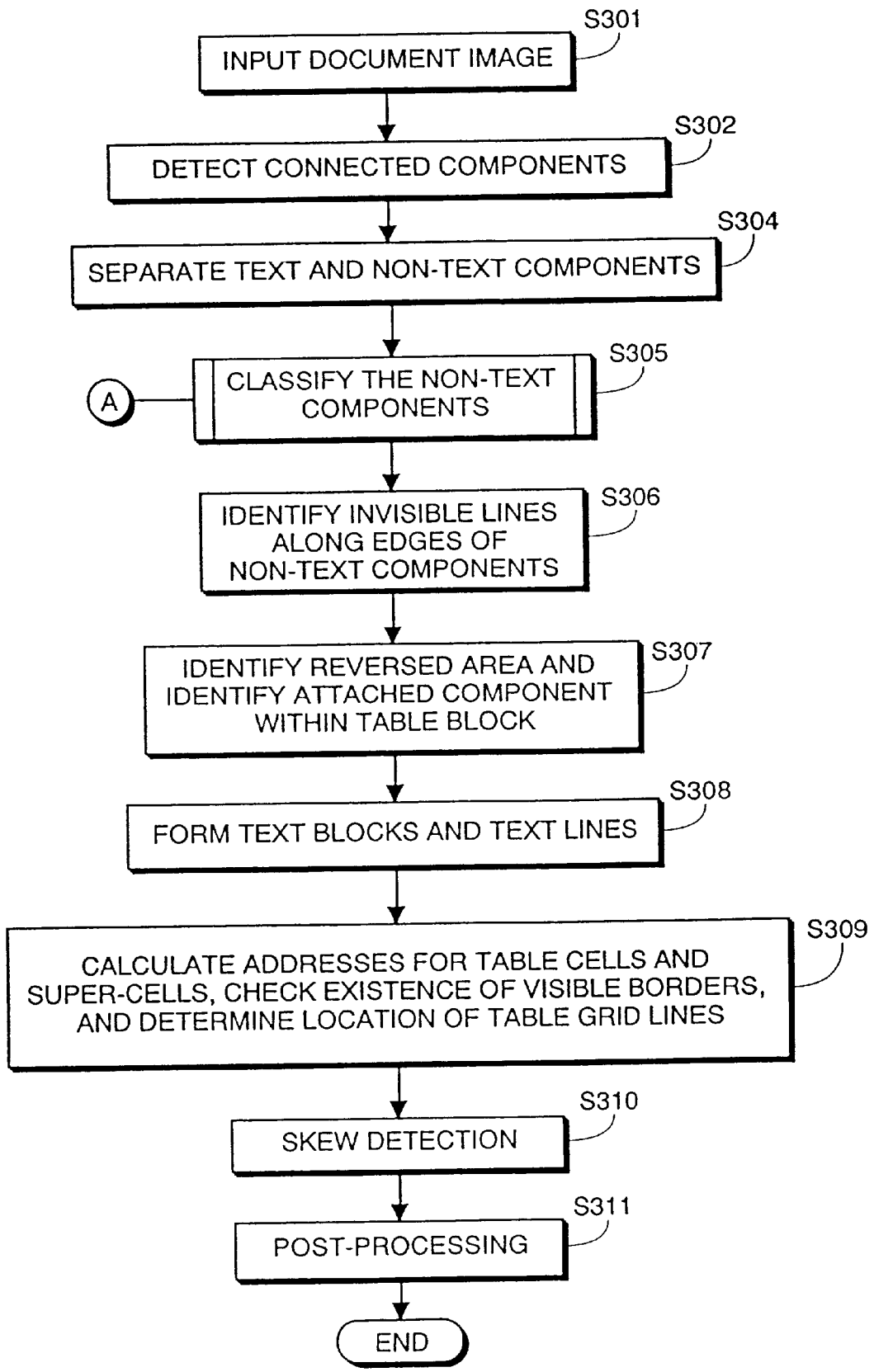
FIG. 3 is a flow diagram describing block selection processing according to the present invention.

FIG. 3 is a flow diagram describing a method of block selection processing according to the present invention. The process steps shown in FIG. 3 are preferably executed by CPU 20 in accordance with a block selection application stored on a computer-readable medium such as disk 3.

Generally, the process steps of FIG. 3 are used to input a document image, to detect connected components within the document image, to separate text and non-text connected components, to classify non-text connected components, to identify white areas along edges of non-text components, to form text block and text lines, to detect skew of the input image, and to post-process the image. Techniques for performing these general steps are disclosed in aforementioned U.S. Pat. Nos. 5,680,479 and 5,588,072.

It should be noted that the process steps of FIG. 3 are also used to identify reversed text areas within a table, which are text areas in which text is composed by white pixels surrounded by black pixels, to identify attached text connected components, to create and calculate addresses for table cells and super-cells, which are areas within a table region bounded by visible vertical and/or horizontal grid lines within the table and which contain at least one table cell, to check the existence of visible cell borders, and to determine the location of table grid lines according to the present invention. In this regard, grid lines within a table are either visible or non-visible and also define each row and column identified within the table.

Specifically, in step S301 of FIG. 3, bit-mapped pixel data of a document image is input into computing system 1 and is stored on disk 3. Preferably, the pixel data is binary pixel data, that is, black and white image data. However, in a case that the image data is halftone image data, in which pixels are represented by one of several grayscale levels, or in a case where the pixel data is color image data, in which each pixel is represented by a multi-bit word encoding color data for the pixel, then threshold processing should be performed so as to binarize the non-binary pixel data into binary pixel data.

It should be noted that image reduction may be performed following step S301. Such image reduction increases the speed of subsequent processing, but may also have an adverse effect on feature-intensive processing, such as optical character recognition.

In step S302, the input pixel data is analyzed so as to detect connected components within the document image. A connected component is a group of black pixels that is completely surrounded by white pixels. The detected connected components are rectangularized, or "blocked", by defining, for each connected component, a smallest rectangle circumscribing the connected component.

In step S304, the connected components are roughly classified into text connected components and non-text connected components. This classification is based on the size of the rectangles circumscribing the connected components and on the fact that non-text connected components are usually larger than text connected components.

Detailed descriptions of steps S301, S302, and S304 are located within aforementioned U.S. Pat. Nos. 5,588,072 and 5,680,479.

In step S305, connected components classified as non-text in step S304 are further analyzed to determine whether they are lines, joint lines, pictures, line art, frames, tables, or unknown (i.e., none of the above).

Figure 4:
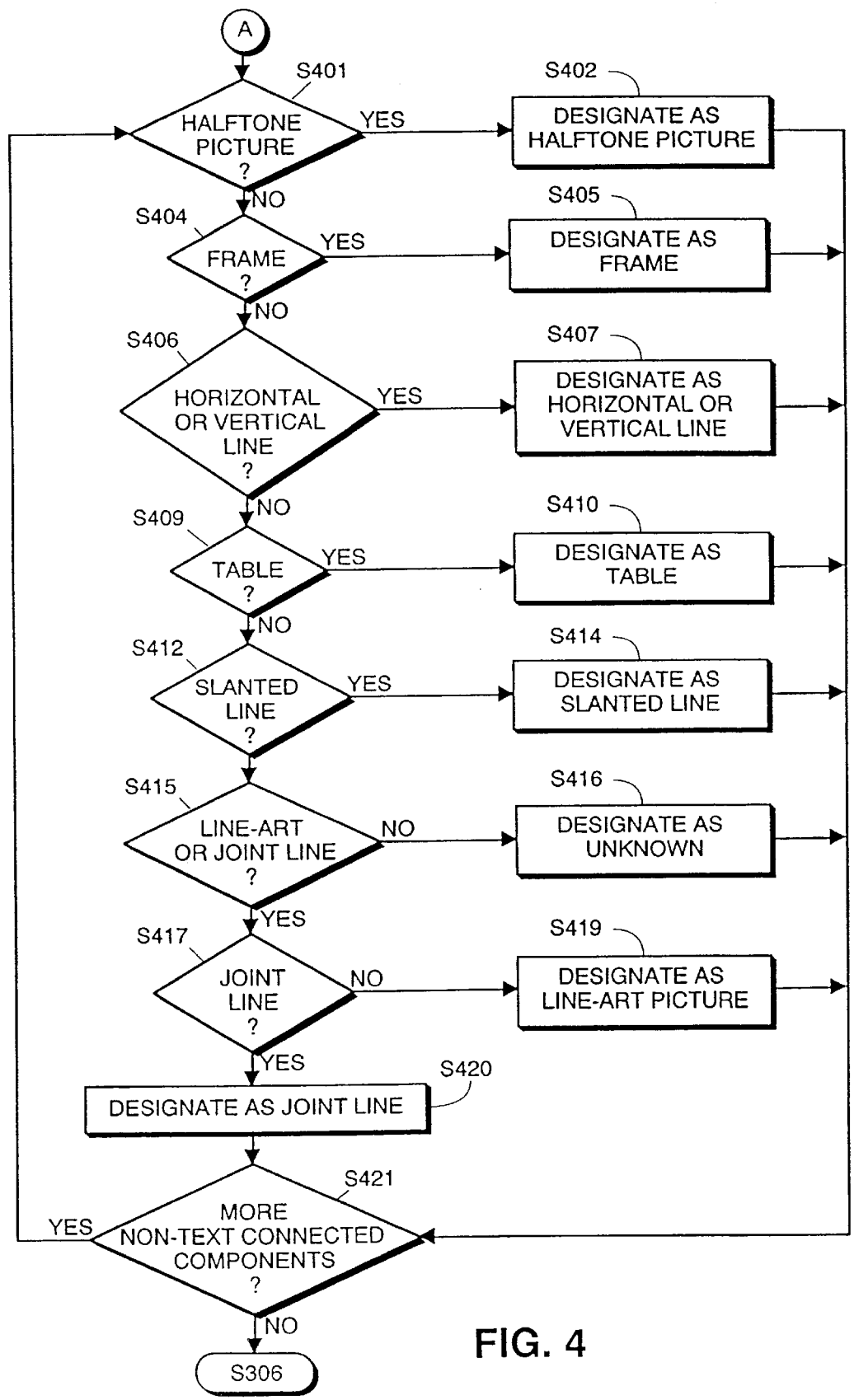
FIG. 4 is a flow diagram describing classification of non-text connected components according to the present invention.

FIG. 4 is a flow diagram describing a method for analyzing non-text connected components according to step S305. Because individual steps of FIG. 4 are described in greater detail in U.S. Pat. Nos. 5,588,072 and 5,680,479, only a general description will be provided below.

Generally, the non-text connected component classification described in FIG. 4 is based on criteria thresholds which are formulated mathematically and calculated dynamically based on the size, width and the like of the connected components being analyzed. Thus, in step S401, a non-text connected component is analyzed to determine whether it is a halftone (or continuous-tone) picture. If so, flow advances to step S402, at which point a "halftone (continuous-tone) picture" sub-attribute is assigned to the non-text connected component.

If the non-text connected component is not determined to be a halftone picture in step S401, then flow advances to step S404 in which it is determined whether the non-text connected component is a frame. If so, flow advances to step 8405 at which time a "frame" sub-attribute is assigned to the connected component. If the determination in step S404 is negative, flow proceeds to step S406, wherein it is determined whether the non-text connected component is a horizontal or vertical line. Flow proceeds to step S407 in a case that the connected component is determined to be a horizontal or vertical line. In step S407, a "horizontal line" or "vertical line" sub-attribute is assigned to the non-text connected component.

Step S409 is executed in a case that, in step S406, the non-text connected component is not determined to be a vertical line or a horizontal line. In step S409, it is determined whether the non-text connected component is a table. Briefly, in order to determine whether the non-text connected component is a table, internal white areas of the connected component are traced in four directions. Internal white areas are areas of white pixels completely surrounded by black pixels. If four internal white areas are found, and if the arrangement of the white areas is in a table-like grid such that the white areas are enclosed by horizontal and vertical lines, then the non-text connected component is designated as a table in step S410. A more detailed description for determining whether a connected component is a table is found in U.S. Pat. No. 5,588,072, U.S. Pat. No. 5,680,479, and U.S. patent application Ser. No. 08/514,252.

Also in step S410, the interior of the identified table is re-analyzed in accordance with steps S302 and S304 so as to identify and classify text and non-text connected components internal to the table.

If it was not determined in step S409 that the non-text connected component is a table, flow advances to step S412 in which it is determined whether the non-text connected component is a slanted line. If so, a "slant line" sub-attribute is assigned to the non-text connected component in step S414.

If the determination in step S412 is negative, flow proceeds to step S415, where it is determined if the non-text connected component is a line-art picture or a joint line. If the non-text connected component is not a line-art picture or a joint line, flow proceeds to step S416, wherein an "unknown" attribute is assigned to the connected component. If so, flow proceeds to step S417, wherein it is determined whether the non-text connected component is a joint line.

If the non-text connected component is not a joint line, then the non-text connected component is, in step S419, designated as a line art picture. If the non-text connected component is determined to be a joint-line picture in step S417, flow proceeds to step S420, where a "joint line" sub-attribute is assigned to the component. Flow then proceeds to step S421.

It should be noted that each of steps S402, S405, S407, S410, S414, S416, and S419 also flow to step S421, wherein it is determined whether additional non-text connected components remain to be classified. If so, flow returns to step S401. If not, flow proceeds to step S306 of FIG. 3.

In step S306, invisible lines are identified along the edge of non-text connected components. As mentioned above, invisible line identification is disclosed in detail in U.S. Pat. Nos. 5,588,072 and 5,680,479. For example, a vertical invisible line, or region of white pixels, may be located in step S306 between two halftone picture connected components. This invisible line can be used in step S308 to determine whether text connected components located below the picture connected components should be grouped together or in separate columnar blocks.

Figure 7:
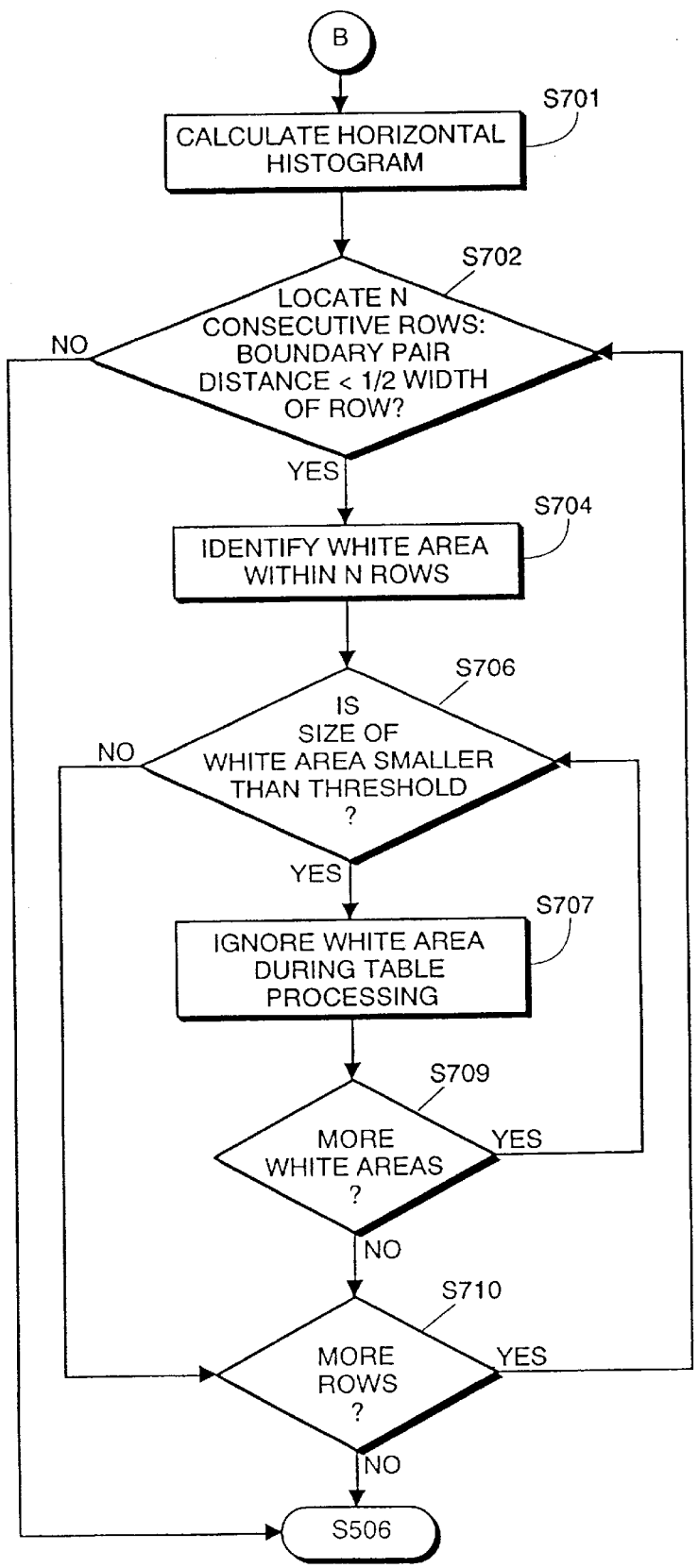
FIG. 7 is a flow diagram describing processing of a reversed table area according to the present invention.

Flow proceeds from step S306 to step S307, in which reversed areas within table regions are identified. A reversed area is a region including text composed of white pixels surrounded by black pixels. Reversed areas within table regions are ignored in subsequent processing according to the present invention so as not to interfere with identification of other table features. A detailed description of reversed area identification is given below with respect to FIGS. 6 and 7.

Also in step S307, connected components which are attached to horizontal and vertical grid lines within table regions are identified. Identification and extraction of attached connected components are described generally below with respect to FIG. 8 and in detail in commonly-assigned U.S. patent application Ser. No. 08/664,674, which has been incorporated into the present disclosure by reference. As also described below, identified attached components are used to identify other features within a table according to the present invention.

Flow continues to step S308, in which text blocks are formed from the text connected components classified in step S304. In this regard, close horizontal and vertical neighbors of each text connected component are aggregated into text blocks based on a statistical analysis of horizontal and vertical gaps between neighboring text units. Next, the formed text blocks are analyzed so as to form text lines. Step S308 is described in detail in U.S. Pat. No. 5,588,072.

Next, in step S309, process steps are executed in accordance with the present invention so as to analyze non-text connected components which have been designated as tables. More specifically, rows and columns within the tables are identified and row and column addresses are assigned to each table cell within the tables. Row and column address identification and assignment are described in detail below with respect to FIGS. 9 to 14.

In addition, locations of vertical and horizontal table grid lines are calculated in step S309, the grid lines defining each identified row and column and being either visible and non-visible. A description of grid line calculation is given below with respect to FIGS. 15 and 16.

Super-cells are also defined in step S309 based on table areas bounded by visible grid lines and containing at least one table cell. Row and column addresses are assigned to the super-cells, and visible grid line borders are identified surrounding each super-cell. Creation of super-cells and identification of visible borders are described with respect to FIGS. 17 and 18 hereinbelow.

Next, in step S310, the skew of the input document image is detected and, if the skew angle exceeds a predefined maximum angle, an error code is output, signaling to the user that the document page is too skewed to complete the block selection process. Skew detection is disclosed in U.S. Pat. Nos. 5,588,072 and 5,680,479.

If the skew is within acceptable limits, flow advances to step S311, in which post-processing is performed. Post-processing is also disclosed in U.S. Pat. Nos. 5,588,072 and 5,680,479. Post-processing is intended to result in a more compact and "clean" block representation of the document image, and can be tailored to suit particular types of subsequent processing, such as character recognition, data compression, and the like. Generally, however, post-processing involves associating text blocks with other text or non-text blocks.

Advantageously, post-processing procedures depend on the page skew determined in step S310. For example, in a case that the page is only slightly skewed, gaps between text blocks are well-defined. Accordingly, blocks are combined aggressively. On the other hand, for a page having a larger skew, circumscribing rectangles likely overlap several text regions, therefore the rectangles are combined more conservatively. Block selection terminates after post-processing.

Execution of the FIG. 3 process steps results in a detailed representation of the location and type of data within a document image. As a result, the FIG. 3 process steps can be used in conjunction with an optical character recognition system so as to recognize characters represented by bit-mapped image data within a table, to convert the characters into an ASCII format, and to input the ASCII characters into a spreadsheet, program based on determined row and column table addresses. In addition, the FIG. 3 process determines information from which the internal features of a table, such as table grid lines, can be substantially reproduced.

Figure 5:
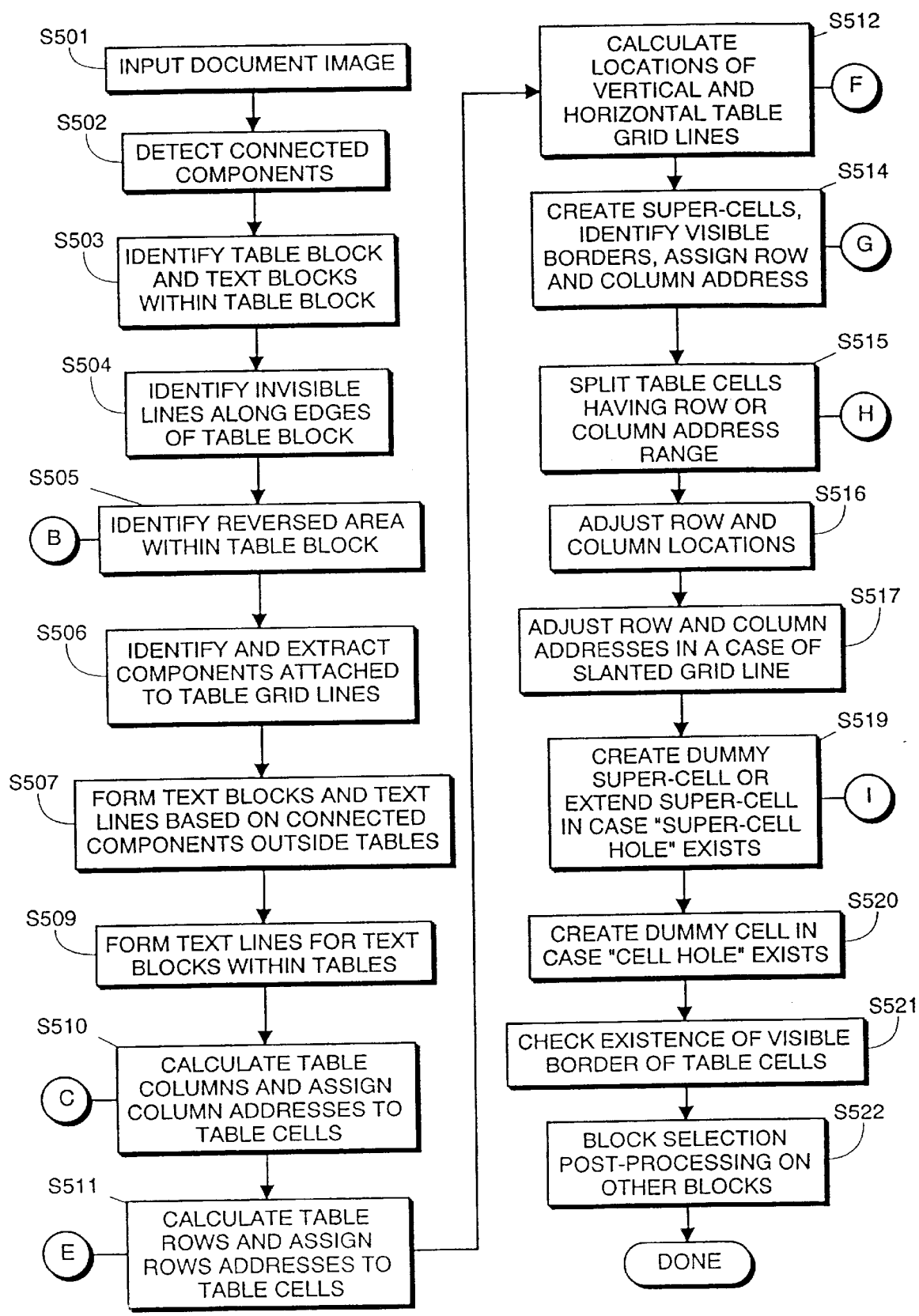
FIG. 5 is a flow diagram specifically directed to block selection processing of table images.

FIG. 5 is a flow diagram which describes in more detail the steps of the FIG. 3 flow diagram, with particular attention paid to analysis of table features. In this regard, steps S501 and S502 correspond to steps S301, S302, S304 and S305 of FIG. 3. Particularly, a document image is input in step S501 and connected components within the document image are detected and blocked in step S502.

In step S503, as described above with respect to steps S304 and S305, a table, as well as text blocks within the table, is identified. Next, in step S504, invisible lines along the edges of the table are also identified for use in subsequent text block formation.

A reversed text area within a subject table is identified in step S505. As mentioned above, a reversed area, which is an area containing text composed of white pixels surrounded by black pixels, is an area to be ignored during subsequent table processing according to the present invention. FIG. 6a shows reversed area 42 within table 40. The slanted lines within area 42 represent areas of black pixels, which are arranged so as to form the word "TITLE" within area 42. Also shown in FIG. 6a are white areas, represented by dashed lines, which are utilized during identification of table 40, as described with respect to step S409 above.

In order to identify reversed areas, flow begins at step S701, in which is calculated a horizontal histogram representing total distances spanned by white boundary pairs within each row of pixels in a table. In this regard, boundary pairs are coordinate locations determined by the intersection of a white area boundary (dashed lines in FIG. 6a) with a particular row of pixels. FIG. 6b shows histogram 44, which results from step S701 and corresponds to table 40.

Flow then proceeds to step S702. Beginning at the top of table 40, each row of pixels is analyzed in step S702, using the dimensions of table 40 and the data reflected in histogram 44, to determine whether the total distance between white boundary pairs within a row of pixels in a table is less than one-half of the total distance spanned by the row. If the foregoing condition is satisfied for N consecutively-analyzed rows, wherein N is a threshold value, flow proceeds to step S704.

In the case of table 40, the number of rows in area 42 is greater than N, therefore flow proceeds to step S704. If N consecutive of such rows are not located, flow proceeds to step S506 of FIG. 5.

In step S704, traced white areas are identified within the N rows identified in step S702. These areas correspond to the interior of each letter formed within area 42. Next, in step S706, the size of each identified white area is compared with a threshold size. The threshold size is preferably defined so as to differentiate text characters or small image noise from larger features. If a size of an identified white area is smaller than the threshold size, it is determined, in step S707, that the white area should be ignored during subsequent table processing. As a result, the white area is not considered during subsequent processing which utilizes white areas within a subject table. Flow then continues to step S709.

If, in step S706, a size of an identified white area is not smaller than the threshold size, a it is determined that the white area does not correspond to reversed text and flow proceeds to step S709.

In step S709, it is determined whether each white area identified in step S704 has been compared with the threshold size. If not, flow returns to step S706 and proceeds as described above. If so, flow proceeds to step S710.

Next, in step S710, it is determined whether the last row of table 40 has been analyzed. If not, flow returns to step S702. However, if each row of table 40 has been analyzed, flow proceeds to step S506.

In step S506, connected components attached to grid lines within a table are identified and extracted. A system for performing such identification and extraction is described in previously-mentioned U.S. application Ser. No. 08/664,674, and therefore will only be described briefly below.

Figure 8:
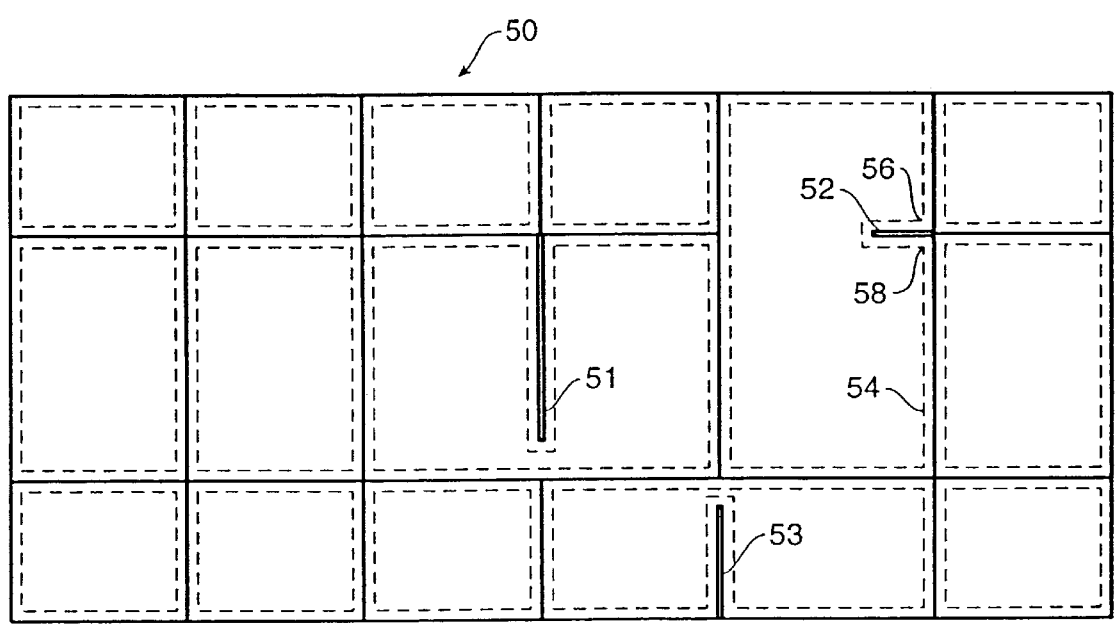
FIG. 8 is a view of a table portion for describing extraction of an attached connected component.

In this regard, FIG. 8 shows table 50, surrounded on all sides by visible table grid lines. Within table area 50 lies other visible table grid lines, with each white area completely surrounded by black pixels being identified by dashed lines. As shown in FIG. 8, several of the visible grid lines include gaps, often caused by poor printing, poor scanning, or the like. These gaps define partial grid lines 51, 52, and 53, also referred to as attached connected components. Due to the proximity of points 56 and 58 of traced white area 54, connected component 52 is extracted, that is, connected component 52 is identified as a connected component separate from the vertical and horizontal grid lines of table area 50. Connected components 51 and 53 are extracted in the same manner. Use of extracted attached connected components is described in detail below.

Returning to FIG. 5, in step S507, as described with respect to step S308, text blocks and text lines are formed based on connected components located outside each table in the input document image. Similarly, in step S509, text blocks and text lines are formed based on text connected components located within each table. Preferably, in step S507, text blocks are examined to determine whether the text blocks are oriented vertically or horizontally, and text lines are formed based on the determination. On the other hand, only horizontal text lines are preferably formed in step S509.

Each text block formed within a table is referred to hereinbelow as a table cell. In this regard, as described above, text connected components which are not combined with other text connected components within a table block are also referred to herein as table cells. Next, in step S510, table columns are calculated and column addresses are assigned to table cells.

Figure 9A:
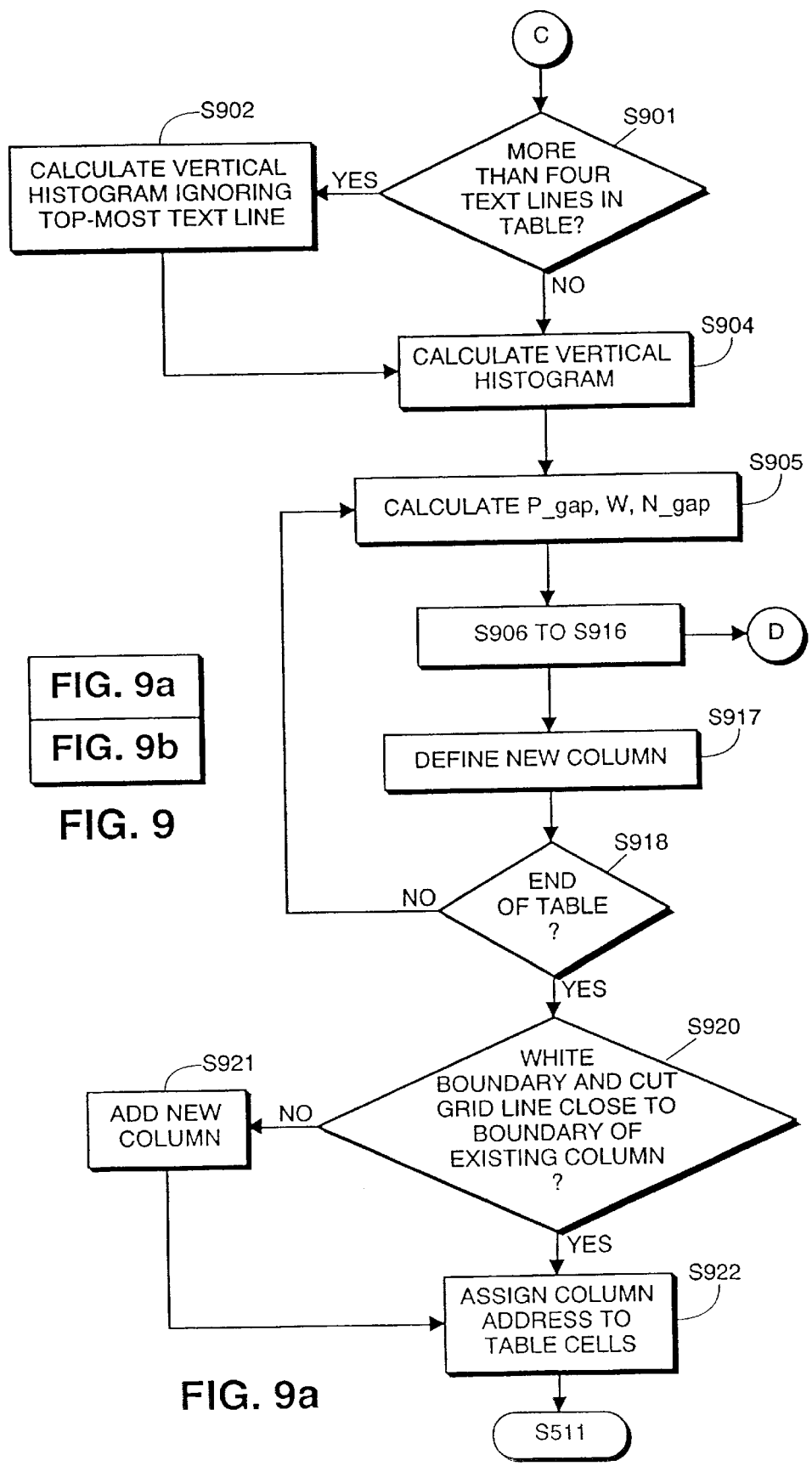
FIGS. 9a and 9b, are flow diagrams describing table column calculation according to the present invention.
Figure 9B:
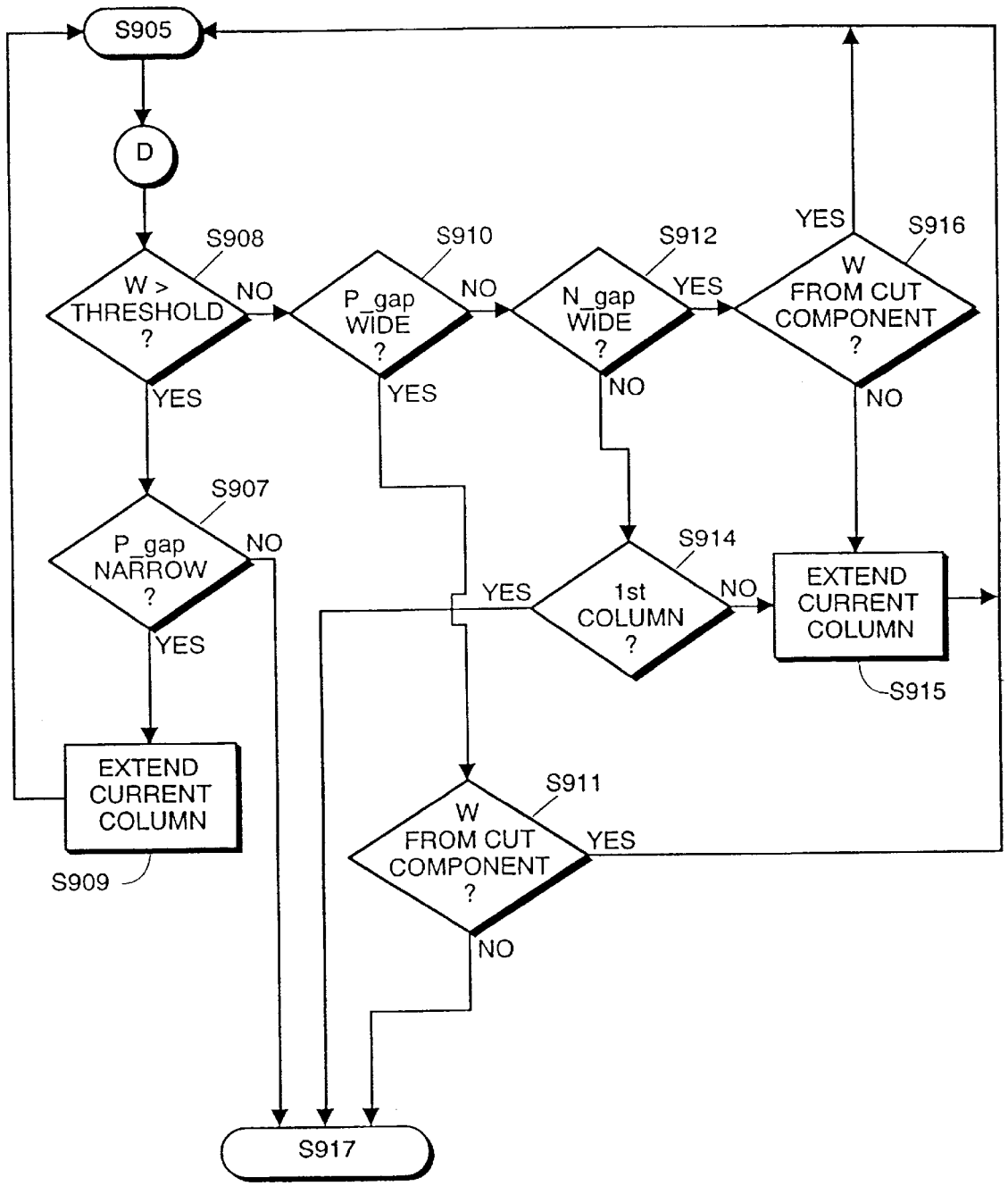

FIGS. 9a and 9b are detailed flow diagrams for describing the process of step S510. The FIG. 9a and 9b flow utilizes a vertical histogram of a table in order to identify table columns and, advantageously, ignores title areas, which may disrupt proper column identification.

In this regard, in step S901 it is determined whether a subject table contains more than four text lines. If so, the top-most text line is assumed to be a title line and is ignored during column identification.

For example, as shown in FIG. 10, table 60 is determined in step S901 to contain more than four rows of text lines. Accordingly, flow proceeds to step S902. In step S902, a vertical histogram, such as vertical histogram 70 of FIG. 10b, is calculated. As mentioned above, vertical histogram 70 is calculated ignoring top-most text line 61, which is assumed to be a title. If the determination in step S901 is negative, flow proceeds directly to step S904, in which a vertical histogram is calculated without ignoring any text lines in the subject table.

It should be noted that the vertical histograms described in FIG. 9a reflect, for each column of pixels in table 60, total vertical distances spanned by rectangles (not shown) circumscribing each connected component within table 60 and described with respect to steps S302 and S502. For example, horizontal and vertical grid lines such as grid lines 64 and 66 are not blocked by circumscribing rectangles and therefore do not contribute to the data reflected in vertical histogram 70. However, it should also be noted that connected components identified and extracted in step S506 are "blocked" and are therefore reflected in histograms calculated according to step S904 or step S902. For example, attached connected component 68 is reflected by portion 71 of histogram 70.

In step S905, a distance over which a calculated histogram reflects a small amount of black pixels, P_ap, a portion of a histogram reflecting relatively more pixels and immediately following P_gap, W, and a histogram portion reflecting a small amount of pixels which immediately follows W, N_gap, are calculated beginning from the left-most point of histogram 70. For example, P_gap, W, and N_gap initially correspond to areas 72, 74, and 75, respectively, of histogram 70. Columns are then assigned according to the respective locations and sizes of P_gap, W, and N_gap.

According to steps S906 to S916 (shown in FIG. 9b), a table is analyzed from left to right. In this regard, steps S906 to S916 determine whether a table region corresponding to a current W should be included in a current column, whether a new column should be defined including the current W, or whether a new column should be defined ignoring the current W.

Initially, it is determined in step S906 whether W is greater than a threshold value, which preferably reflects a small text character size. If so, flow proceeds to step S907, in which it is determined whether P_gap is narrow. If P_gap is not narrow, flow proceeds to step S917, in which a new column is defined including W. This configuration of W and P_gap is illustrated in FIG. 11a.

If it is determined in step S907 that P_gap is narrow, flow proceeds to step S909, wherein the definition of the current column is extended to include W. This situation is shown in FIG. 11b. Flow then returns to step S905.

If, in step S906, it is determined that W is not greater than the threshold value, flow proceeds to step S910, in which it is determined whether P_gap is wide. If so, flow proceeds to step S911, where it is determined whether W reflects a cut connected component, such as connected component 52 of table 50. If W does not reflect a cut connected component, flow proceeds to step S917 wherein a new column is defined, which includes W. FIG. 11c reflects this situation.

If, in step S911, it is determined that W reflects a cut connected component, as shown in FIG. 11d, the right-most border of the current column is defined at the left edge of P_gap, and flow returns to step S905 to define a new P-gap, W. and N_gap. Accordingly, the reflected cut connected component is not included in any defined column.

Returning to step S910, if it is determined that P_gap is not wide, flow proceeds to step S912. In step S912, it is determined whether N_gap is wide. If not, flow proceeds to step S914 wherein it is determined whether-the current column is the first column in the subject table. If so, flow proceeds to step S917 as described above. Such a situation is reflected in FIG. 11e, wherein the current column is defined to terminate at the initial point of N_gap.

If, in step S914, it is determined that the current column is not the first column in the subject table, flow proceeds to step S915, wherein the current column is extended to include W. Such a situation is shown in FIG. 11f. Flow then returns to step S905.

If N_gap is determined to be wide in step S912, flow proceeds to step S916, where it is determined whether W reflects a cut connected component. If not, flow proceeds to step S915 in order to include W, shown in FIG. 11g, into the current column. If the determination in step S916 is affirmative, the right-most border of the current column is defined at the left edge of P-gap, and flow simply returns to step S905 so as to ignore the cut connected component. This situation is shown in FIG. 11h.

Returning to FIG. 9a, flow proceeds from step S917 to step S918. If the right-most portion of a histogram reflecting the subject table has been reached at this point, flow continues to step S920. If not, flow returns to step S905.

Upon reaching step S920, several columns are defined within a subject table. These columns are addressed sequentially from left to right and are defined according to left and right X-coordinate boundaries. In this regard, FIGS. 12a and 12b show table 76 and corresponding column definitions A and B. As shown in FIG. 12b and due to table cell 79, column A should be split into two separate columns. Steps S920 and S921 are meant to address this situation.

In step S920, left and right boundaries of detected white areas and cut vertical grid lines are examined to determine whether these features lie close to any defined column boundaries. If so, flow continues to step S923. If any detected white boundaries or cut grid lines are not close to a column boundary, flow proceeds to step S921, in which a new column is defined surrounding the white boundaries or cut grid lines. All column addresses are then updated accordingly.

FIG. 12c shows the column definitions of table 76 after step S921. In particular, because the right boundary of white area 78 is not close to the boundary of any defined column, a new column B is defined adjacent to the right boundary of area 78. Accordingly, the address of the previous column B is updated to column C.

Next, in step S922, each table cell is assigned a column address corresponding to the column locations spanned by the table cell. In some cases, the assigned column address may include a range of column addresses. For example, table cell 77 is assigned column address A, while table cell 79 is assigned column address A to B. Flow proceeds from Step S922 to step S511 in order to calculate table rows and assign row addresses to table cells.

Figure 13:
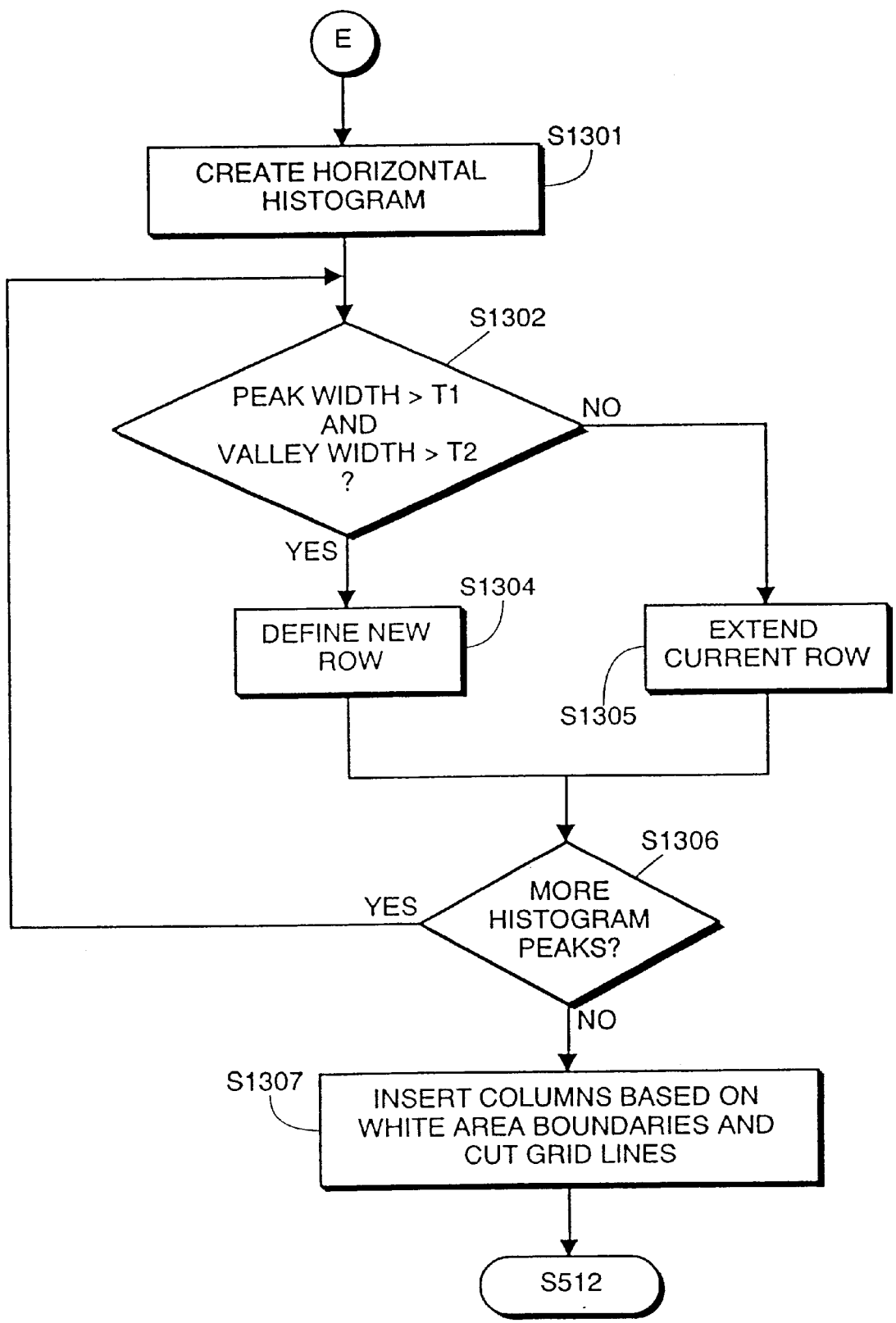
FIG. 13 is a flow diagram describing table row calculation according to the present invention.

FIG. 13 is a detailed flow diagram describing the process steps executed in step S511 to calculate table rows and assign row addresses to is table cells. Flow begins in step S1301, in which a horizontal histogram of a subject table is created. FIG. 14 illustrates subject table 80 and horizontal histogram 86 created in accordance with step S1301. Horizontal histogram 86 reflects, for each row of pixels in table 80, horizontal distances spanned by rectangles (not shown) circumscribing each connected component within table 80.

In this regard, peak width pw1 of histogram 86 reflects table cells 81 and 82, peak width pw2 reflects table cell 84, and peak width pw3 reflects table cell 83. Valley widths vw1 and vw2 indicate regions between peak width pw1 and peak width pw2, and between peak width pw2 and peak width pw3, respectively.

In step S1302, the upper-most peak in histogram 86 is initially engined. Particularly, it is determined whether an initial peak width pw in a current row is greater than a threshold value, the threshold value preferably being indicative of a minimum character size, and whether a next valley width vw is greater than a second threshold value, the second threshold value preferably being indicative of a minimum row spacing. If both conditions are satisfied, flow proceeds to step S1304, wherein a new row is defined corresponding to a next-encountered peak. If one of the conditions is not satisfied in step S1302, flow proceeds to step S1305, in which the current row is extended so as to include a next-encountered peak. In either case, flow proceeds from step S1304 and step S1305 to step S1306.

In step S1306 it is determined whether additional horizontal histogram peaks exist. If so, flow returns to step S1302. If not, flow proceeds to step S1307.

In step S1307, horizontal white area boundaries and attached horizontal grid lines within table 80 are identified. Similarly to above-described steps S920 to S922, in a case that an identified white boundary or grid line is not close to any row boundaries, a new row is defined and row addresses are updated accordingly. Flow then proceeds to step S512.

Figure 15:
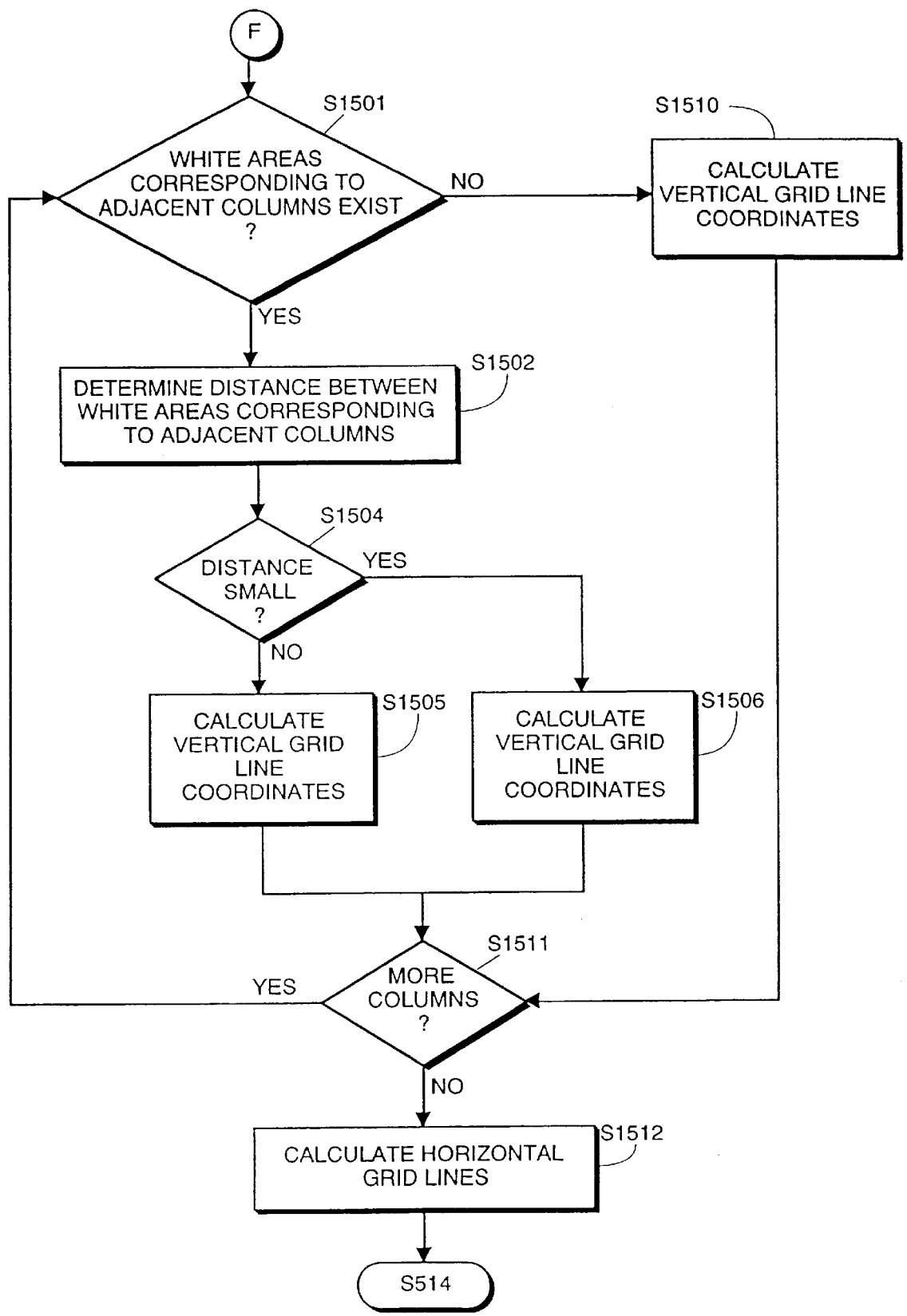
FIG. 15 is a flow diagram describing a process for locating vertical and horizontal grid lines according to the present invention.

In step S512, vertical and horizontal grid line locations are calculated. FIG. 15 is a flow diagram describing the process steps of step S512 in detail. Flow begins at step S1501, wherein it is determined whether a current and an adjacent column are each surrounded by corresponding traced white areas. If so, flow proceeds to step S1502. In step S1502, a distance between the corresponding white areas is determined. Next, in step S1504, if the distance determined in step S1502 is not smaller than a threshold distance, flow proceeds to step S1505, wherein a vertical grid line coordinate is calculated. If it is determined in step S1504 that the distance is smaller than a threshold value, flow proceeds to step S1506, wherein a vertical grid line coordinate is calculated based on, preferably, a different equation than that used in step S1505.

If it is determined in step S1501 that white areas corresponding to adjacent columns do not exist, flow proceeds to step S1510 in which a vertical grid line coordinate is calculated using an equation different than those used in step S1505 and step S1506. Flow then proceeds to step S1511, at which it is determined whether more columns exist. If so, flow returns to step S1501. If not, flow proceeds to step S1512.

In step S1512, horizontal grid lines for a subject table are calculated using steps substantially similar to those described in steps S1501 to S1511, although rotated through 90 degrees.

FIG. 16 illustrates two subject tables for describing the FIG. 15 flow. With respect to FIG. 16a, table 90 contains column C1 and column C2, column C1 being bounded by X-coordinates C1L and C1R and with column C2 being bounded by X-coordinates C2L and C2R. Traced white area 91 corresponds to column C1 and contains border bi, and traced white area 92 corresponds to column C2 and contains border b2.

Accordingly, in step S1501, it is determined that white areas corresponding to each of adjacent columns C1 and C2 exist. At step S1502, the distance between b1 and b2 is determined. In a case that areas 91 and 92 contain regions sharing a common X-coordinate, for example, in a case that a slanted vertical line separates areas 91 and 92, border bi is defined as the right-most X-coordinate of area 91, and b2 is defined as the left-most X-coordinate of area 92.

If the distance between b1 and b2 is not judged to be small in stop S1504, flow proceeds to step S1505. In a preferred embodiment, the coordinate location of a vertical grid line between columns C1 and C2 is determined in step S1505 by the equation min(max((T,C1R), C2L), wherein T max(b1, b2)−1.

If the distance between b1 and b2 is judged to be small in step S1504, flow proceeds to step S1506, wherein a vertical grid line coordinate is calculated to exist at min[max((b1+b2)/2, C1R, C2L)].

FIG. 16b shows table 95 in which column C3 is bounded by coordinates C3L and C3R and wherein column C4 is bounded by coordinates C4L and C4R. It should be understood that because column C3 is not bounded on both sides by a visible grid line, no white area exists corresponding to column C3. Accordingly, in a case that column C3 and column C4 are examined as adjacent columns using the process steps described in FIG. 15, the determination in step S1501 is negative and flow proceeds to step S1510. In step S1510, a vertical grid line location corresponding to columns C3 and C4 is determined by the equation min(T,C4L) wherein T=max(C3R, b4)−1.

Figure 17:
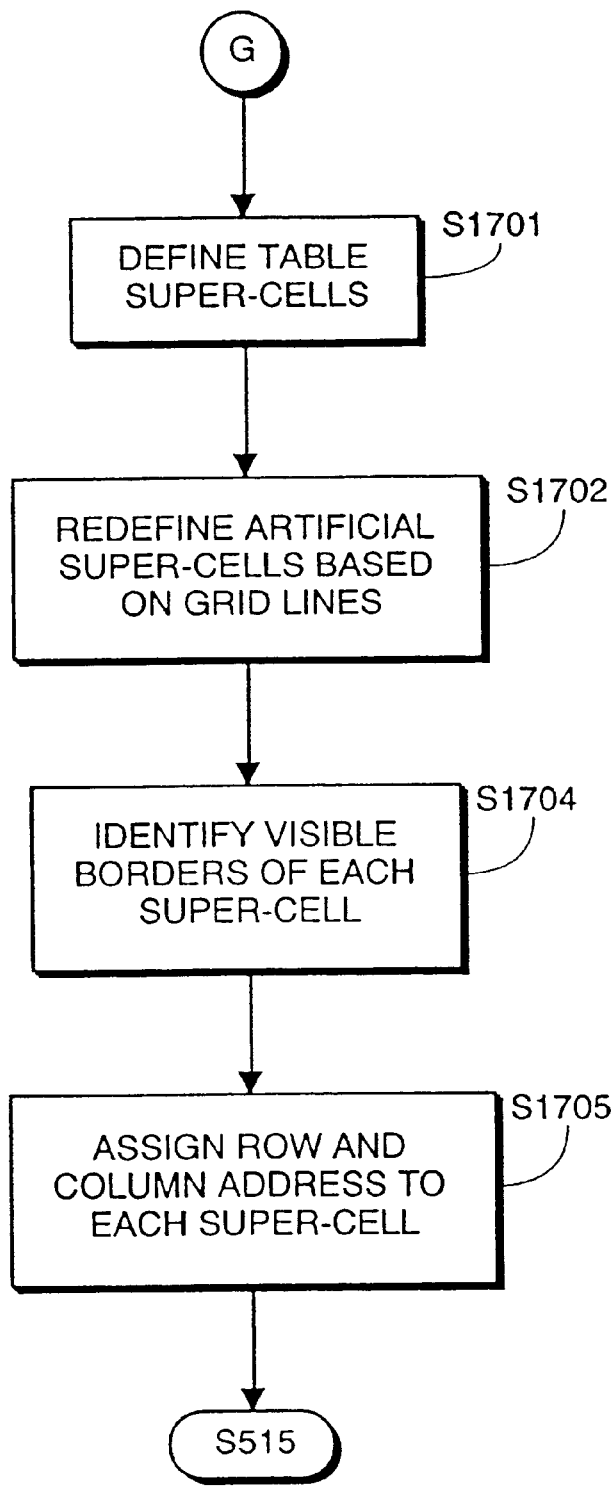
FIG. 17 is a flow diagram describing super-cell creation according to the present invention.

After executing step S1512 with respect to horizontal grid lines, flow proceeds to step S514, in which super-cells are identified. FIG. 17 is a detailed flow diagram for describing super-cell identification in accordance with step S514. In this regard, at step S1701, super-cells are identified corresponding to each white area bordered by black pixels within a subject table. In a case that a table cell exists which is not surrounded by a traced white area, an "artificial" super-cell is also formed in step S1701 having the same location and dimensions of the table cell. Next, in step S1702, each artificial super-cell is reformatted to approximate dimensions of surrounding visible or non-visible table grid lines. Flow then continues to step S1704.

In step S1704, the top, bottom, left, and right borders of each super-cell are examined to identify whether or not visible grid lines are adjacent to the borders. Flow proceeds to step S1705, wherein row and column addresses are assigned to the super-cells based on the rows and columns calculated in steps S510 and S511. Flow continues from step S1705 to step S515.

FIG. 18 shows a subject table for describing the FIG. 17 flow diagram. In this regard, table 100 contains table cells 101, 102, 104 and 105. Table cell 101 is not surrounded by a white area because table cell 101 does not lie in an area completely surrounded by black pixels. However, table cells 102, 104 and 105 are surrounded by white areas 106, 107 and 109.

With respect to the FIG. 17 flow, super-cells are initially defined in step S1701 corresponding to each white area within table 100. Accordingly, super-cells are defined corresponding to white areas 106, 107 and 109. These super-cells are shown in FIG. 18b as super-cells 115, 111 and 112. As described above, because no white area surrounds table cell 101, an artificial super-cell is also defined having identical coordinates to those of table cell 101.

In step S1702, the artificial super-cell is reformatted according to the following algorithm to approximate visible or non-visible table grid lines surrounding the artificial super-cell:

Top border=min(grid line_top, text_cell_top);
Bottom border=max(grid_line_bottom, text_cell_bottom);
Left border=min(grid_line_left, text_cell_left), and
Right border=max(grid_line_right, text_cell_right).
Resulting super_cell 114 is shown in FIG. 18b.

Next, in step S1704, each super-cell is examined to identify visible grid lines bordering the super-cell. For example, visible grid lines are identified at the right and bottom of super-cell 114, at the top, right, left and bottom of super-cell 115, at the top, right, left and bottom of super-cell 112, and at the top, right, left and bottom of super-cell 111.

It should be noted that, in a case that a particular super-cell is partially bordered on a particular side by a partially visible grid line, it is determined in stop S1704 whether the partial grid line exceeds a certain threshold length corresponding to the length of a "complete" border. If so, it will be determined in step S1704 that the partial grid line completely borders the particular side of the particular super-cell.

Flow proceeds from step S1704 to step S1705, wherein row and column addresses are assigned to each super-cell of FIG. 18b. In FIG. 18b, the super-cells share the same column and row locations as their respective table cells. Accordingly, super-cells 111, 112, 114 and 115 also share the row and column addresses of table cells 104, 105, 101 and 102, respectively. It should be noted that, in a case that a super-cell is located within several rows or columns, the super-cell address will contain a row and/or column address range, such as (1, 2–4). Flow then proceeds to step S515.

Figure 20:
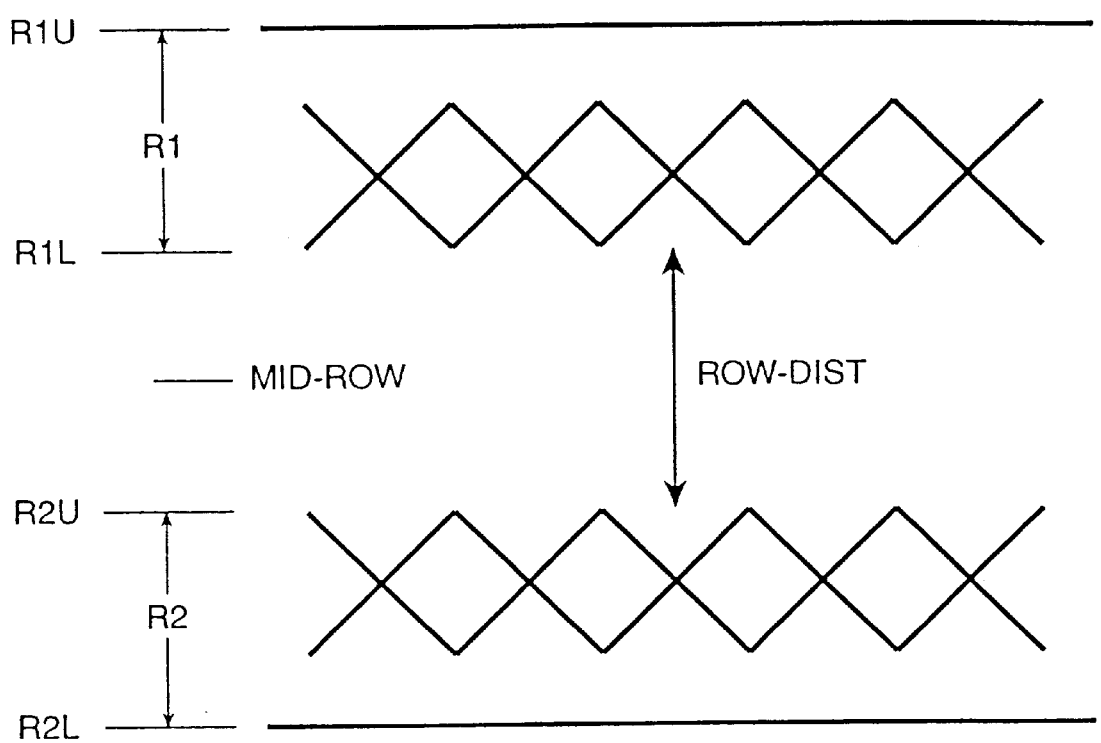
FIG. 20 is a view of a table portion for describing row splitting according to the present invention.

In step S515, table cells having a row and/or column address range are split, if appropriate. In this regard, the foregoing process steps may result in table cells spanning several rows or columns which should be more properly classified as multiple table cells. For example, FIG. 19, comprising FIGS. 19a, 19b, and 19c, illustrates several table cells having a column address range. Similarly, FIG. 20 illustrates a table cell having a row address range. In this regard, FIG. 21a and FIG. 21b describe steps for splitting table calls having a column address range and a row address range, respectively.

In order to split table cells having a column address range, flow begins at step S2101. In step S2101, a table cell having a column address range is identified. Next, in step S2102, a vertical histogram of the identified table cell is calculated. The vertical histogram reflects, for each column of pixels in the identified table cell, the total vertical distance spanned by rectangles (not shown) circumscribing each connected component in the table cell. Flow proceeds to step S2104, wherein it is determined whether an area of the histogram corresponding to a space between adjacent columns of the table cell reflects any black pixels. If any black pixels are reflected, flow continues to step S2105.

In step S2105, it is determined whether the histogram of the area between the columns is nonzero for a continuous distance greater than a threshold distance. If so, flow proceeds to step S2114, in which it is determined whether additional columns exist within the address range of the subject table cell. Such a situation is illustrated in FIG. 19a, in which 1 indicates a continuous non-zero portion of a histogram between columns r and r+1. If additional columns exist, flow returns to step S2104.

In a case that additional columns do not exist in step S2114, it is determined in step S2115 whether the subject table contains additional table cells having a column address range. If so, flow returns to step S2102. If not, flow continues to step S2116 of FIG. 21b.

Figures 21, 21A:
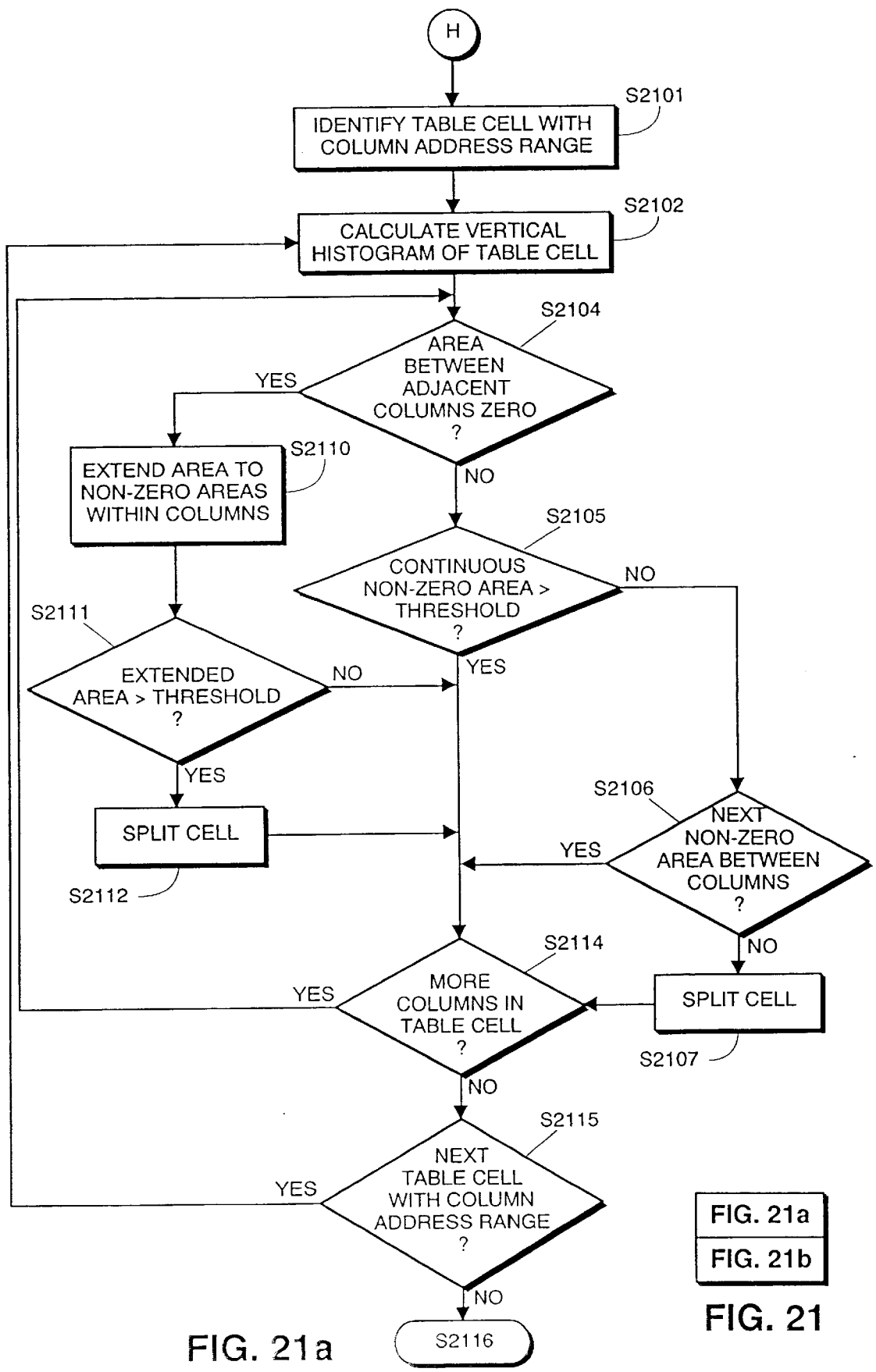
FIG. 21, comprising
FIGS. 21a and 21b, is a flow diagram for describing table cell column and row splitting according to the present invention.

FIG. 19b illustrates a situation in which, in step S2105 of FIG. 21a, it is determined that continuous non-zero portion m is less than a threshold. Accordingly, flow proceeds to step S2106, in which it is determined whether a separate non-zero portion is located between columns s and s+1 of FIG. 19b. If not, table cell 116 is redefined as two new table cells, one having column address s and the other having column address s+1, such that neither of the two new cells contain portion m.

If a separate non-zero portion is located between columns s and s+1 in step S2106, flow continues to step S2114 and continues as described above.

In a case that, in step S2104, it is determined that the area between two columns of a subject table cell does not contain black pixels, flow proceeds to step S2110. In step S2110, the area between the two columns is extended into the two columns until a black pixel is encountered in each column. As shown in FIG. 19c, area n between columns t and t+1 of table cell 117 contains no black pixels. Accordingly, in step S2110, area n is extended in both horizontal directions until black pixels within table cell 117 are encountered. The resulting area is indicated as n'.

In step S2111, it is determined whether the length of an area such as area n' is greater than a threshold value. If so, table cell 117 is split into two table cells in step S2112 and flow continues to step S2114. If not, flow simply proceeds to step S2114 and eventually to step S2116 of FIG. 21b.

Figure 21B:
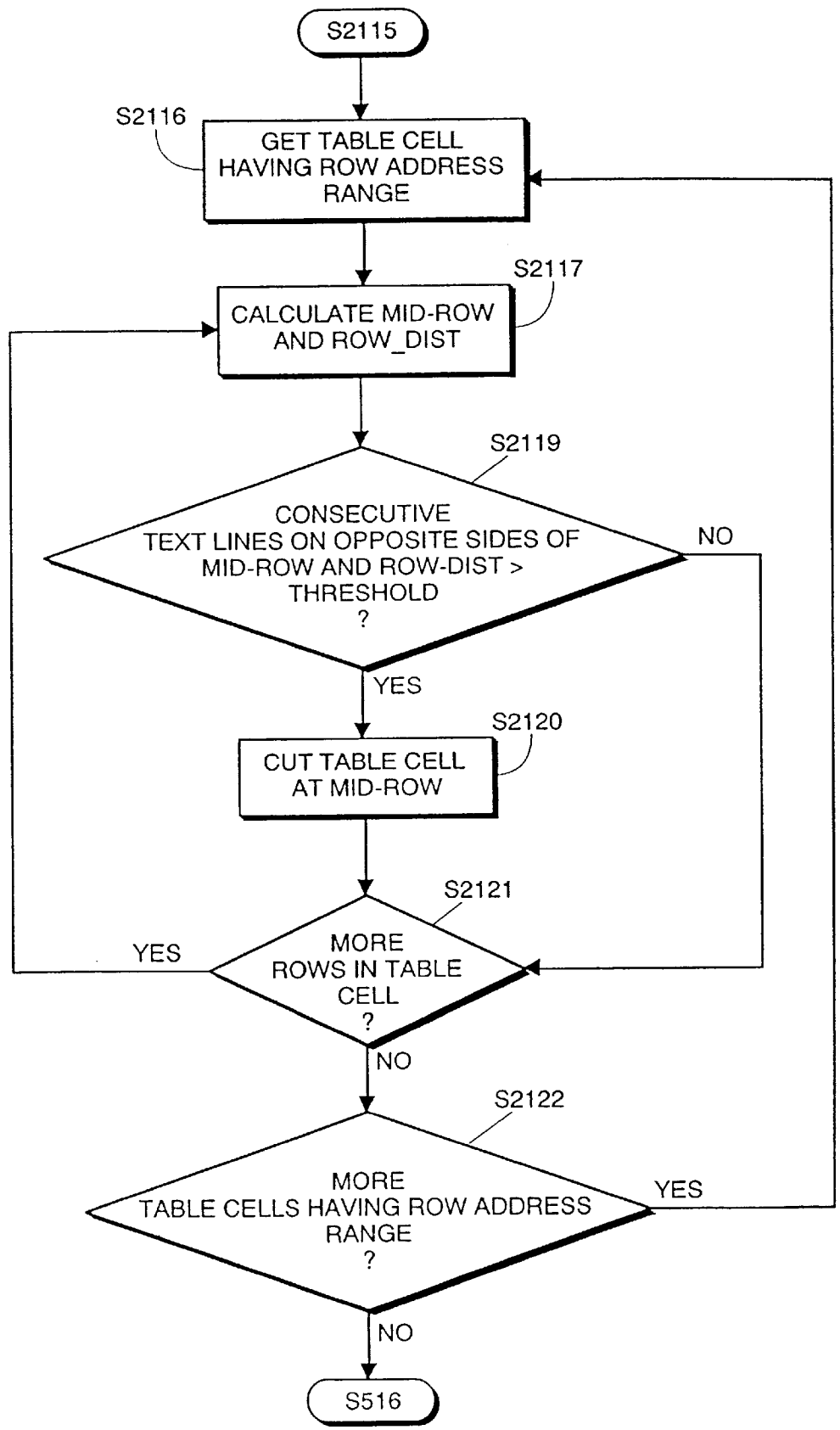

The process steps of FIG. 21b are used to split table cells having a row address range according to the present invention. In step S2116, a subject table cell having a row address range is retrieved. Next, in step S2117, two rows in the row address range are examined to determine a distance between the rows and a mid-point between the rows. These two quantities are represented by row_dist and mid_row in FIG. 20.

In FIG. 20, a table cell includes row R1 and row R2 in its row address range. The upper bounds of row R1 is defined by coordinate R1U and the lower bound of row R1 is define by coordinate R1L. Similarly, the upper bound of row R2 is defined by R2U and the lower bound is defined by R2L. As shown in FIG. 20, the quantity mid_row refers to the mid-point between R1L and R2U. In addition, the quantity row_dist refers to the distance between R1L and R2U.

Next, in step S2119, it is determined whether the retrieved table cell includes consecutive text lines located on opposite sides of mid_row and whether row_dist is greater than a threshold line size. If so, flow proceeds to step S2120, wherein the subject table cell is cut into two cells at the mid_row coordinate, one of the two cells containing row R1 in its row address and the other cell containing row R2 in its row address. Flow then proceeds to step S2121.

If the determination in step S2119 is negative, flow also proceeds to step 52121, wherein it is determined whether the subject table cell contains additional rows. If so, flow returns to step S2117. If not, flow continues to step S2122, in which it is determined whether other table cells having a row address range exist in the subject table. If so, flow returns to step S2116. If not, flow continues to step S516 in order to delete spurious rows and columns resulting from the flow of steps S510 to S515.

FIG. 22 is a diagram for describing the process steps of step S516. For example, as shown in FIG. 22a, numeral 130 indicates a right border of column C5. Right border 130 is located adjacent to vertical grid line 132. Since no connected components exist in column C6, located between right column border 130 and vertical grid-line 132, column C6 is deleted by eliminating border 130. Accordingly, grid line 132 will be newly defined as the right-most border of column C5.

FIG. 22b illustrates a second situation for which column locations are updated in step S516. As shown in FIG. 22b, slanted line 134 has caused column C9 to be defined between left border 135 and right border 136. Accordingly, column C9 is deleted by replacing borders 135 and 136 by a single border (not shown) between newly-expanded columns C8 and C10. Flow continues from step S516 to step S517.

In step 517, row and column addresses of super-cells are adjusted so as to reduce incorrect address assignment due to slanted table grid lines.

Figure 23:
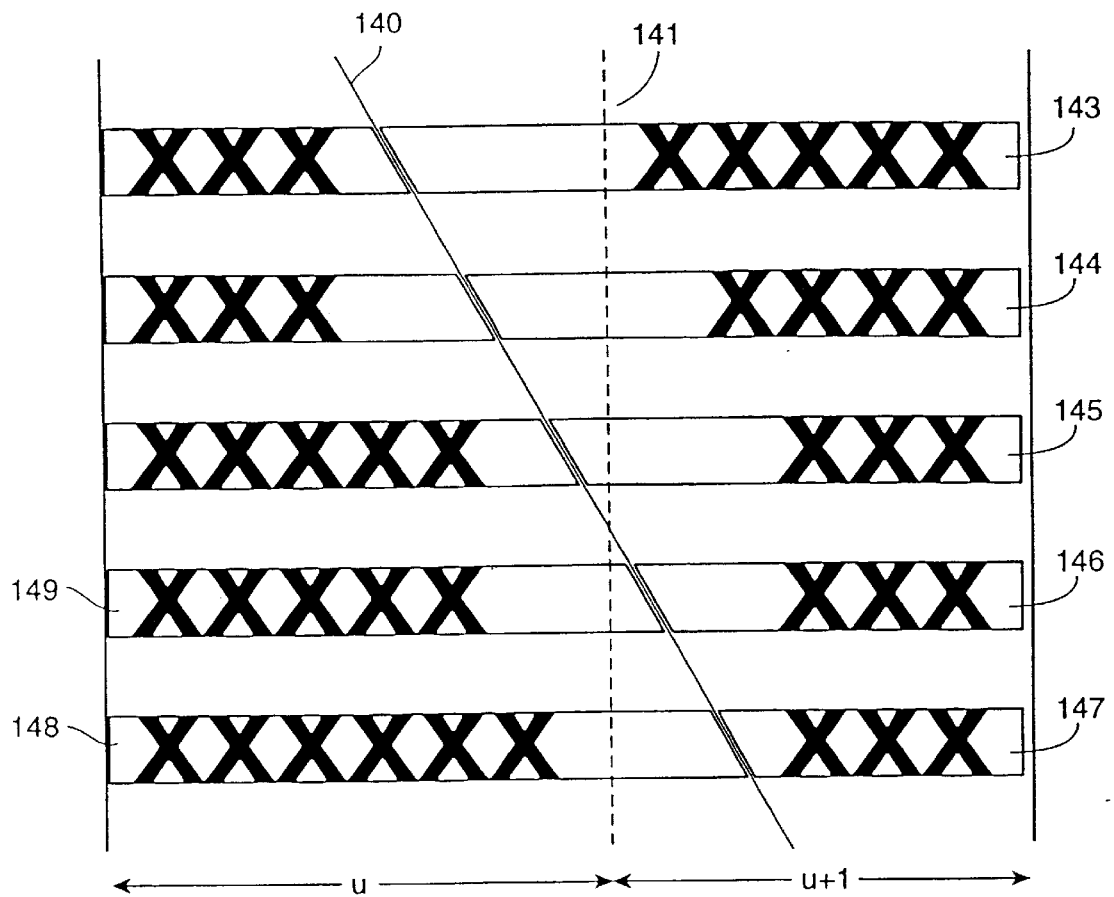
FIG. 23 shows a table portion for describing column address adjustment based on slanted grid lines.

For example, FIG. 23 illustrates a situation in which a slanted table grid line has caused incorrect row and column address assignment. In particular, slanted vertical grid line 140 intersects columns u and u+1, which are defined at their right and left borders, respectively, by non-visible grid line 141. Due to slanted line 140, super-cells 143 to 145 have a column address range of (u–u+1), even though the black pixels contained within cells 143 to 145 exist completely within column u+1.

Several criteria are evaluated in step S517 to determine whether a column address of a super-cell should be updated to exclude a left-most column. First, it is determined whether a left border of a subject super-cell lying in column u+1 is located in column u. Second, it is determined whether a distance between the left border and grid line 141 is less than a threshold value. Third, it is determined whether all connected components within the super-cell are to the right of grid line 141. Fourth, it is determined whether a super-cell exists within column u at the row addresses of the subject super-cell. If these four criteria are satisfied, column u is deleted from the definition of the subject super-cell and the subject super-cell dimensions are redefined.

Figure 24:
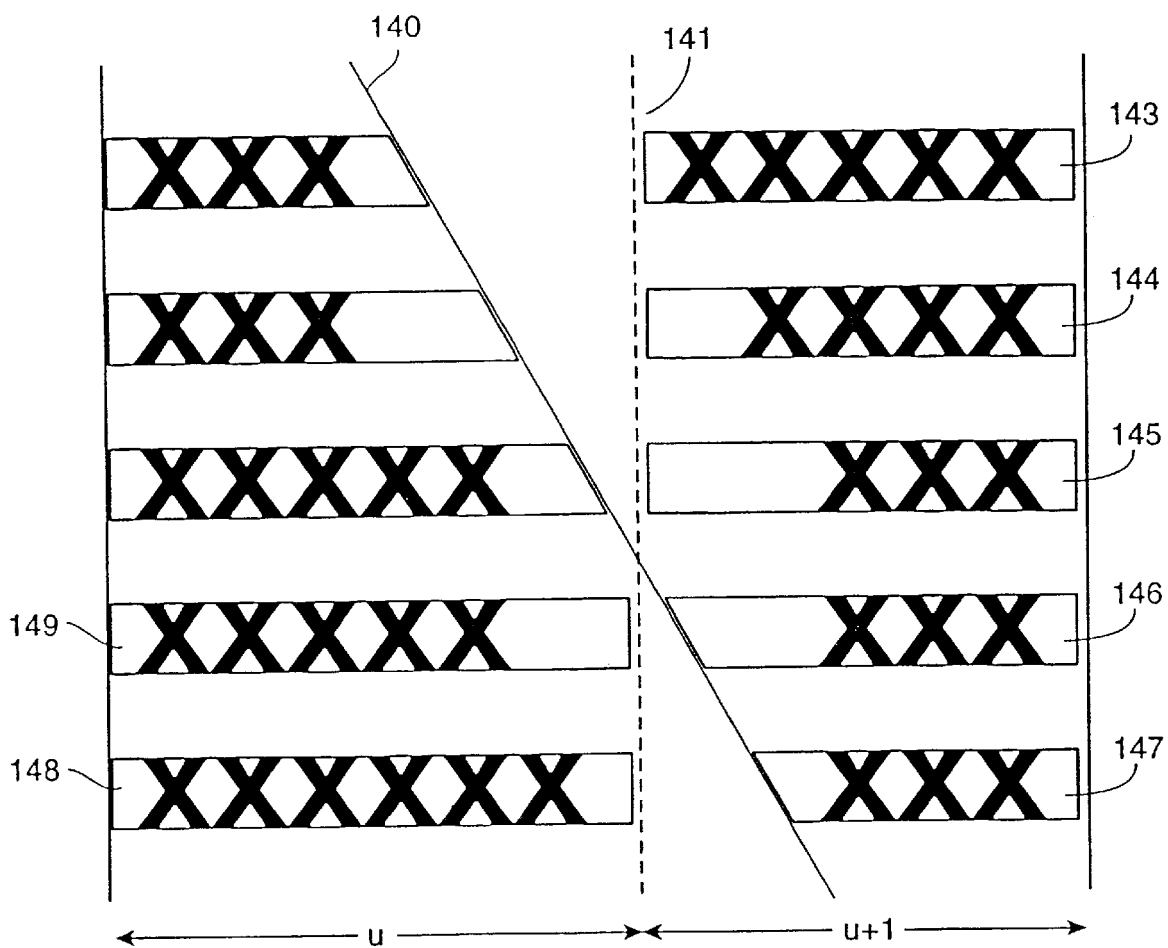
FIG. 24 is a view of the FIG. 23 table portion after column address adjustment according to the present invention.

In the case of FIG. 23, super-cells 143 to 145 satisfy the above criteria. A resulting redefinition of super-cells 143 to 145 is shown in FIG. 24. FIG. 24 also reflects redefinition of super-cells 148 and 149 based on a modified version of the above criteria, which is used to determine whether a right-most column should be deleted from a super-cell column address range.

According to the modified criteria, it is first determined whether a right border of a subject super-cell lying in column u is located in column u+1. Second, it is determined whether a distance between the right border and grid line 141 is less than a threshold value. Third, it is determined whether all connected components within the super-cell are to the left of grid line 141. Fourth, it is determined whether a super-cell exists within column u+1 at the row addresses of the subject super-cell. If these four criteria are satisfied, column u+1 is deleted from the definition of the subject super-cell and the subject super-cell dimensions are redefined.

It should be understood that the foregoing criteria can be adapted similarly to address forward-slanting grid lines, rather than backward-slanting grid line 140 of FIGS. 23 and 24. In this regard, criteria similar to the above are also used in step S517 to adjust super-cell row addresses due to slanted horizontal lines.

Step S519 is executed after step S517 so as to create dummy super-cells or to extend a super-cells in case a "super-cell hole" exists. FIG. 26 is an example showing situations in which "super-cell holes" arise. As shown in FIG. 26a, no visible grid line exists to the left of table cell 160. Therefore, as described above with respect to the method of FIG. 17, super-cell is created, and is bordered by non-visible grid lines to its left and bottom. White area 163 is surrounded by black pixels, therefore super-cell 164 was assigned in step S1701 corresponding to white area 163. In contrast, since area 165 neither contains a connected component nor a white area surrounded completely by black pixels, a super-cell has not been assigned to area 165.

As described, "super-cell holes" exist between the lower border of super-cell 162 and horizontal grid line 161, and in area 165.

Figure 25:
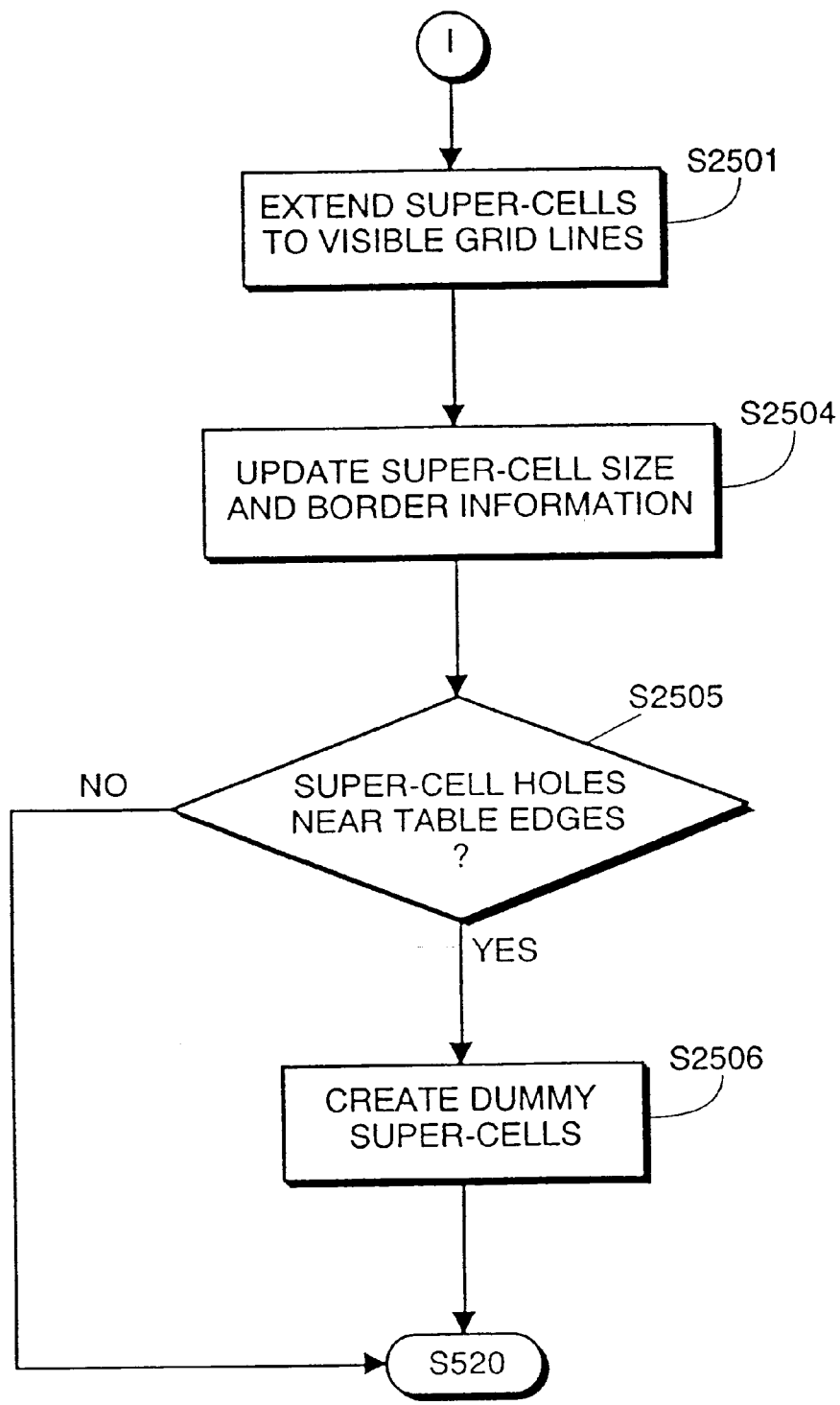
FIG. 25 is a flow diagram describing creation of dummy super-cells according to the present invention.

The flow diagram illustrated in FIG. 25 addresses the situation shown in FIG. 26a. In particular, flow begins at step S2501, in which each super-cell border is extended to a corresponding visible grid line. Super-cell size and border information is then updated in step S2504. In step S2505, the left, right top and bottom edges of a subject table are analyzed to determine whether any areas such as area 165 exist. If so, a dummy super-cell is created surrounding each of such areas in step S2506. Flow then proceeds to step S520. If no areas such as area 165 exist, flow proceeds directly from step S2505 to step S520.

After application of the FIG. 25 steps, super-cell 162 is extended as shown in FIG. 26b. Also shown in FIG. 26b is dummy super-cell 167 corresponding to area 165.

Figure 27:
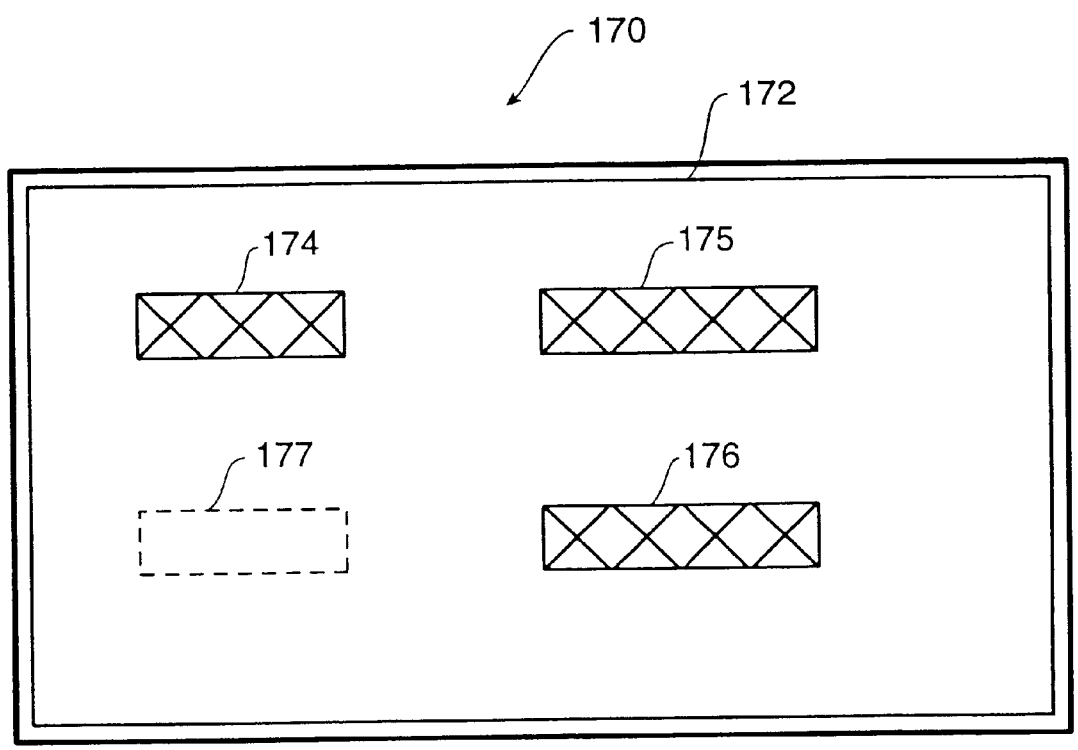
FIG. 27 illustrates a dummy cell according to the present invention.

Returning to the processing described in FIG. 5, step S520 includes steps to create a dummy cell in a case that a "cell hole" exists. FIG. 27 shows a table containing a cell hole. In particular, table 170 contains, among other things, super-cell 172. Within super-cell 172 are table cells 174, 175 and 176. Based on the row and column addresses of table cells 174 to 176 and on the dimensions of super-cell 172, it is determined that a table cell is missing from location 177, indicated by a dash line. This location is referred to as a cell hole. Accordingly, in step S520, a cell is defined at location 177.

Of course, the cell defined in step S520 does not contain any connected components. However, such a cell is useful for defining and quickly reproducing table features. Moreover, such a cell allows data to be easily added at location 177 to a file representing table 170 because the file will contain a pre-defined cell at location 177.

FIG. 28 is an example of a table having visible table cell borders according to step S521. Particularly, FIG. 28a shows table 180 containing table cells 181 to 186. Also shown are super-cell 187, which contains table cells 181 and 182, and super-cell 188, which contains table cells 183 to 186.

In step S521, each table cell is examined to determine whether it is bounded by a visible grid line on its top, bottom, left, or right. In this regard, table cell 181 is bounded on its top and right sides, table cell 182 is bounded on its right and bottom sides, table cell 183 is bounded on its top and left sides, table cell 184 is bounded on its left and bottom sides, table cell 185 is bounded on its bottom and right sides, and table cell 180 is bounded on its top and right sides. The determined information can be stored along with definitions of table cell type, table cell row and column address, and table cell location and size.

FIG. 28b is an example for describing storing data regarding visible borders surrounding table cells. In particular, FIG. 28b shows a matrix representing each table cell of table 180. As shown in the matrix, and corresponding to FIG. 28a, the circles in FIG. 28b indicate non-visible table cell borders, while the dashes indicate visible table cell borders. By reference to a matrix such as that shown in FIG. 28b, internal grid lines of a table analyzed according to the present invention can be quickly reproduced.

Flow continues from step S521 to S522, wherein skew detection and post-processing is performed as described above with respect to steps S310 and S311 of FIG. 3.

It should be noted that the information determined by the FIG. 5 flow is preferably stored in a hierarchical tree structure representing a subject table. In a preferred embodiment, data regarding super-cells, which includes row and column addresses of a super-cell, super-cell coordinates, table cells included within a super-cell, and information regarding the existence of visible borders of the super-cell, are stored in a node representing the table block, such as node 200 in FIG. 29a. Node 200 also stores table coordinates, column and row range, and location of visible and invisible vertical and horizontal grid lines.

Descending from node 200 are table cell nodes 202 to 204. These table cell nodes contain data representative of table cell coordinates, table cell row and column addresses, the existence of visible table cell borders, and surrounding super-cells are stored in nodes representative of a subject table cell.

FIG. 29b shows an alternative representation of the FIG. 29a hierarchical tree. in the tree of FIG. 29b, super-call nodes 205 and 206 are defined separately from table node 200, and have descending therefrom nodes representative of table cells contained within a corresponding super-cell. It should be understood that in the FIG. 29b tree structure, super-cell nodes 205 and 206, rather than node 200, contain data regarding the super-cell frames, which includes column and row addresses of a super-cell, super-cell coordinates, table calls included within a super-cell, and information regarding the existence of visible borders of the super-call.

While the present invention is described above with respect to what is currently consider its preferred embodiment, it is to be understood that the invention is not limited to that described above. To the contrary, the invention is intended to cover various modifications and equivalent arrangements includes within the spirit and scope of the appended claims.

What is claimed is:

1. A method for performing block selection processing on an image of a table, the table comprised of rows and columns defined by visible and non-visible vertical and horizontal grid lines and containing super-cells, the super-cells including one or more table cells, the method comprising:

identifying super-cells that include one or more table cells, wherein super-cells are identified according to traced white areas surrounding table cells and bounded by visible grid lines;

determining whether the vertical and horizontal grid lines bounding each table cell are visible or non-visible; and determining whether the vertical and horizontal grid lines bounding each super-cell are visible or non-visible.

2. A method according to claim 1, further comprising the steps of:

detecting areas of reversed text within the image of the table;

calculating a vertical histogram reflecting connected components within the image of the table, the histogram not reflecting connected components within-the detected areas;

defining columns within the image of the table according to the vertical histogram; and re-defining the columns based on locations of traced white areas and partial grid lines with respect to the defined columns.

3. A method according to claim 2, wherein the step of detecting areas of reversed text comprises:

calculating a horizontal histogram of the image of the table reflecting white pixels within the image;

identifying consecutive rows within the image in which a total distance between boundary pixels in a row is less than one half of a total length of the row;

detecting a traced white area within the consecutive rows;

determining whether the detected traced white area corresponds to reversed text according to a size of the traced white area.

4. A method according to claim 1, further comprising:

detecting areas of reversed text within the image of the table;

calculating a horizontal histogram reflecting connected components within the image of the table, the histogram not reflecting connected components within the detected areas;

defining rows within the image of the table according to the horizontal histogram; and re-defining the rows based on locations of traced white areas and partial grid lines with respect to the defined rows.

5. A method according to claim 4, wherein the step of detecting areas of reversed text comprises:

calculating a horizontal histogram of the image of the table reflecting white pixels within the image;

identifying consecutive rows within the image in which a total distance between boundary pixels-in a row is less than one half of a total length of the row;

detecting a traced white area within the consecutive rows;

determining whether the detected traced white area corresponds to reversed text according to a size of the traced white area.

6. A method according to claim 1, wherein, in said identifying step, a first super-cell is identified according to a location and a dimension of a first table cell in a case that the first table cell is not surrounded by a white area.

7. A method according to claim 6, further comprising identifying a dummy table cell at a row and column address within a second super-cell in a case that the second super-cell does not include a table cell at the row and column address.

8. A method according to claim 7, further comprising storing data regarding the identified super-cells in a hierarchical tree structure which reflects a physical layout of the image of the table.

9. A method according to claim 1, further comprising:

determining a distance between traced white areas corresponding to adjacent columns;

calculating a location of a vertical grid line corresponding to the adjacent columns based on the determined distance.

10. A method according to claim 9, wherein an uppermost text line in the table image is ignored in a case that the table image includes more than four rows of text lines.

11. A computer-readable medium storing computer-executable process steps to perform block selection processing on an image of a table, the table comprised of rows and columns defined by visible and non-visible vertical and horizontal grid lines and containing super-cells, the super-cells including one or more table cells, the steps comprising:

an identifying step to identify super-cells that include one or more table cells, wherein super-cells are identified according to traced white areas surrounding table cells and bounded by visible grid lines;

a determining step to determine whether the vertical and horizontal grid lines bounding each table cell are visible or non-visible; and a determining step to determine whether the vertical and horizontal grid lines bounding each super-cell are visible or non-visible.

12. A computer-readable medium storing computer-executable process steps according to claim 11, further comprising:

a detecting step to detect areas of reversed text within the image of the table;

a calculating step to calculate a vertical histogram reflecting connected components within the image of the table, the histogram not reflecting connected components within the detected areas.;

a defining step to define columns within the image of the table according to the vertical histogram; and a re-defining step to re-define the columns based on locations of traced white areas and partial grid lines with respect to the defined columns.

13. A computer-readable medium storing computer-executable process steps according to claim 12, wherein the step of detecting areas of reversed text comprises:

a calculating step to calculate a horizontal histogram of the image of the table reflecting white pixels within the image;

an identifying step to identify consecutive rows within the image in which a total distance between boundary pixels in a row is less than one half of a total length of the row;

a detecting step to detect a traced white area within the consecutive rows;

a determining step to determine whether the detected traced white area corresponds to reversed text according to a size of the traced white area.

14. A computer-readable medium storing computer-executable process steps according to claim 11, further comprising:

a detecting step to detect areas of reversed text within the image of the table;

a calculating step to calculate a horizontal histogram reflecting connected components within the image of the table, the histogram not reflecting connected components within the detected areas;

a defining stop to define rows within the image of the table according to the horizontal histogram; and a re-defining step to re-define the rows based on locations of traced white areas and partial grid lines with respect to the defined rows.

15. A computer-readable medium storing computer-executable process steps according to claim 14, wherein the step of detecting areas of reversed text comprises:

a calculating step to calculate a horizontal histogram of the image of the table reflecting white pixels within the image;

an identifying step to identify consecutive rows within the image in which a total distance between boundary pixels in a row is less than one half of a total length of the row;

a detecting step to detect a traced white area within the consecutive rows;

a determining step to determine whether the detected traced white area corresponds to reversed text according to a size of the traced white area.

16. A computer-readable medium storing computer-executable process steps according to claim 11, wherein, in said identifying step, a first super-cell is identified according to a location and a dimension of a first table cell in a case that the first table cell is not surrounded by a white area.

17. A computer-readable medium storing computer-executable process steps according to claim 16, further comprising an identifying to identify a dummy table cell at a row and column address within a second super-cell in a case that the second super-cell does not include a table cell at the row and column address.

18. A computer-readable medium storing computer-executable process steps according to claim 17, further comprising a storing step to store data regarding the identified super-cells in a hierarchical tree structure which reflects a physical layout of the image of the table.

19. A computer-readable medium storing computer-executable process steps according to claim 11, further comprising:

a determining step to determine a distance between traced white areas corresponding to adjacent columns;

a calculating step to calculate a location of a vertical grid line corresponding to the adjacent columns based on the determined distance.

20. A computer-readable medium storing computer-executable process steps according to claim 19, wherein an uppermost text line in the table image is ignored in a case that the table image includes more than four rows of text lines.

21. A method for analyzing a document image, comprising:

inputting the document image;

detecting connected components within the document image;

identifying a table block based on the detected connected components and on white areas within the table block image;

identifying reversed text areas within the table block;

identifying attached connected components within the table;

forming text blocks and text lines within the table block;

calculating table rows and table columns within the table image;

assigning row and column addresses to table cells within the table block;

calculating locations of vertical and horizontal table grid lines;

defining super-calls that include one or more of the table cells, wherein super-cells are identified according to the white areas;

determining whether vertical and horizontal grid lines bounding each super-cell are visible or non-visible;

splitting table cells having a row or column address range;

re-defining row and column addresses in a case that a slanted visible grid line exists within the table block;

defining a super-cell based on a super-cell hole in the table block;

defining a dummy table cell based on a cell hole within the table block; and determining whether vertical and horizontal grid lines bounding each table cell are visible or non-visible.

22. A computer-readable medium storing computer-executable process steps to analyze a document image, the process steps comprising:

an inputting step to input the document image;

a detecting step to detect connected components within the document image;

an identifying step to identify a table block based on the detected connected components and on white areas within the table block image;

an identifying step to identify reversed text areas within the table block;

an identifying step to identify attached connected components within the table;

a forming step to form text blocks and text lines within the table block;

a calculating step to calculate table rows and table columns within the table image;

an assigning step to assign row and column addresses to table cells within the table block;

a calculating step to calculate locations of vertical and horizontal table grid lines;

a defining step to define super-cells that include one or more of the table cells, wherein super-cells are identified according to the white areas;

a determining step to determine whether vertical and horizontal grid lines bounding each super-cell are visible or non-visible;

a splitting step to split table cells having a row or column address range;

a re-defining step to re-define row and column addresses in a case that a slanted visible grid line exists within the table block;

a defining step to define a super-cell based on a super-cell hole in the table block;

a defining step to define a dummy table cell based on a cell hole within the table block; and a determining step to determine whether vertical and horizontal grid lines bounding each table cell are visible or non-visible.

23. An apparatus for performing block selection processing on an image of a table, the table comprised of rows and columns defined by visible and non-visible vertical and horizontal grid lines and containing super-cells, the super-cells including one or more table cells, comprising:

a memory which stores executable process steps; and a processor which executes process steps in the memory to: (1) identify super-cells that include one or more table cells, wherein super-cells are identified according to traced white areas surrounding table cells and bounded by visible grid lines, (2) determine whether the vertical and horizontal grid lines bounding each table cell are visible or non-visible, and (3) determine whether the vertical and horizontal grid lines bounding each super-cell are visible or non-visible.

24. An apparatus according to claim 23, wherein the processor further executes steps to: (1) detect areas of reversed text within the image of the table, (2) calculate a vertical histogram reflecting connected components within the image of the table, the histogram not reflecting connected components within the detected areas, (3) define the columns within the image of the table according to the vertical histogram, and (4) re-define the columns based on locations of the traced white areas and partial grid lines with respect to the columns.

25. An apparatus according to claim 24, wherein the processor detects areas of reversed text by: (1) calculating a horizontal histogram of the image of the table reflecting white pixels within the image, (2) identifying consecutive rows within the image in which a total distance between boundary pixels in a row is less than one half of a total length of the row, (3) detecting a traced white area within the consecutive rows, and (4) determining whether the detected traced white area corresponds to reversed text according to a size of the traced white area.

26. An apparatus according to claim 23, wherein the processor further executes steps to: (1) detect areas of reversed text within the image of the table, (2) calculate a horizontal histogram reflecting the connected components within the image of the table, the histogram not reflecting the connected components within the detected areas, (3) define rows within the image of the table according to the horizontal histogram, and (4) re-define the rows based on locations of the traced white areas and partial grid lines with respect to the rows.

27. An apparatus according to claim 26, wherein the processor detects areas of reversed text by: (1) calculating a horizontal histogram of the image of the table reflecting the white pixels within the image, (2) identifying consecutive rows within the image in which a total distance between boundary pixels in a row is less than one half of a total length of the row, (3) detecting a traced white area within the consecutive rows, and (4) determining whether the detected traced white area corresponds to reversed text according to a size of the traced white area.

28. An apparatus according to claim 23, wherein, to identify super-cells that include one or more table cells, a first super-cell is identified according to a location and a dimension of a first table cell in a case that the first table cell is not surrounded by a white area.

29. An apparatus according to claim 28, wherein the processor further executes the process step of identifying a dummy table cell at a row and column address within a second super-cell in a case that the second super-cell does not include a table cell at the row and column address.

30. An apparatus according to claim 29, wherein the processor further executes the process step of storing data regarding the identified super-cells in a hierarchical tree structure which reflects a physical layout of the image of the table.

31. An apparatus according to claim 23, wherein the processor further executes the process steps of determining a distance between the traced white areas corresponding to adjacent columns, and calculating a location of a vertical grid line corresponding to the adjacent columns based on the determined distance.

32. An apparatus according to claim 31, wherein an uppermost text line in the table image is ignored in a case that the table image includes more than four rows of text lines.

33. An apparatus for analyzing a document image, comprising:

a memory which stores executable process steps; and a processor which executes process steps in the memory to: (1) input the document image, (2) detect connected components within the document image, (3) identify a table block based on the detected connected components and on white areas within the table block image, (4) identify reversed text areas within the table block, (5) identify attached connected components within the table, (6) form text blocks and text lines within the table block, (7) calculate table rows and table columns within the table image, (8) assign row and column addresses to table cells within the table block, (9) calculate locations of vertical and horizontal table grid lines, (10) define super-cells that include one or more of the table cells, wherein super-cells are identified according to the white areas, (11) determine whether vertical and horizontal grid lines bounding each super-cell are visible or non-visible, (12) split table cells having a row or column address range; (13) re-define row and column addresses in a case that a slanted visible grid line exists within the table block, (14) define a super-cell based on a super-cell hole in the table block, (15) define a dummy table cell based on a cell hole within the table block, and (16) determine whether vertical and horizontal grid lines bounding each table cell are visible or non-visible.

* * * * *

UNITED STATES PATENT AND TRADEMARK OFFICE
CERTIFICATE OF CORRECTION

PATENT NO. : 6,173,073 B1
DATED : January 9, 2001
INVENTOR(S) : Shin-Ywan Wang

It is certified that error appears in the above-identified patent and that said Letters Patent is hereby corrected as shown below:

Column 3,
Line 32, "FIG. " should read -- FIGS.--

Column 6,
Line 20, "8405" should read -- S405 --

Column 12,
Line 22, "engined" should read -- examined --

Column 13,
Line 10, "bi" should read -- b1 --
Line 18, "bi" should read -- b1 --
Line 25, "T" should be -- T= --

Column 15,
Line 53, "bounds" should read -- bound --

Column 16,
Line 2, "52121" should read -- S2121 --

Column 18,
Line 1, "180" should read -- 186 --
Line 45, "consider" should read -- considered --
Line 49, "includes" should read -- included --

Signed and Sealed this

Thirteenth Day of November, 2001

Attest:

NICHOLAS P. GODICI
Attesting Officer
Acting Director of the United States Patent and Trademark Office